United States Patent [19]
Watanabe et al.

[11] Patent Number: 5,109,339
[45] Date of Patent: Apr. 28, 1992

[54] ANTI-LOCK BRAKE CONTROL APPARATUS INCLUDING MEANS FOR DETECTING AVERAGE WHEEL ACCELERATION FOR DETERMINING BRAKE PRESSURE DECREASE TIME

[75] Inventors: Masao Watanabe, Nagoya; Kazunori Sakai, Aichi, both of Japan

[73] Assignee: Toyota Jidosha Kabushiki Kaisha, Aichi, Japan

[21] Appl. No.: 520,556

[22] Filed: May 8, 1990

[30] Foreign Application Priority Data

May 23, 1989 [JP] Japan ............................ 1-129687
Jul. 20, 1989 [JP] Japan ............................ 1-188441

[51] Int. Cl.⁵ .............................................. B60T 8/60
[52] U.S. Cl. ................................. 364/426.02; 303/99; 180/197
[58] Field of Search ............ 364/426.01, 426.02, 364/426.03; 180/197; 303/99, 105

[56] References Cited

U.S. PATENT DOCUMENTS

| | | | |
|---|---|---|---|
| 3,637,264 | 1/1972 | Leiber et al. | 303/105 |
| 4,668,024 | 5/1987 | Nakanishi et al. | 303/119 |
| 4,739,484 | 4/1988 | Fennel | 364/426.02 |
| 4,842,343 | 6/1989 | Akiyoshi et al. | 303/103 |
| 4,870,582 | 9/1989 | Hoashi et al. | 364/426.02 |
| 4,883,325 | 11/1989 | Shimanuki et al. | 303/96 |
| 4,929,035 | 5/1990 | Shimanuki | 303/106 |

FOREIGN PATENT DOCUMENTS 1914765 10/1970 Fed. Rep. of Germany.

Primary Examiner—Thomas G. Black
Attorney, Agent, or Firm—Oliff & Berridge

[57] ABSTRACT

A vehicle anti-lock brake control apparatus including a two-position direction control valve disposed between a wheel brake cylinder and a hydraulic pressure source, for increasing and decreasing the brake cylinder pressure, a slip detector for detecting a slip condition of the wheel, a controller for controlling the valve so as to prevent excessive slipping of the wheel, an averaging device for obtaining an average value of the wheel acceleration during a period until the detected slip condition deteriorates to a predetermined reference condition, and a device for determining a pressure decrease time substantially in reverse proportion to the average value of the wheel acceleration obtained when the slip condition has deteriorated to the reference condition, and supplying the controller with the determined pressure decrease time.

18 Claims, 16 Drawing Sheets

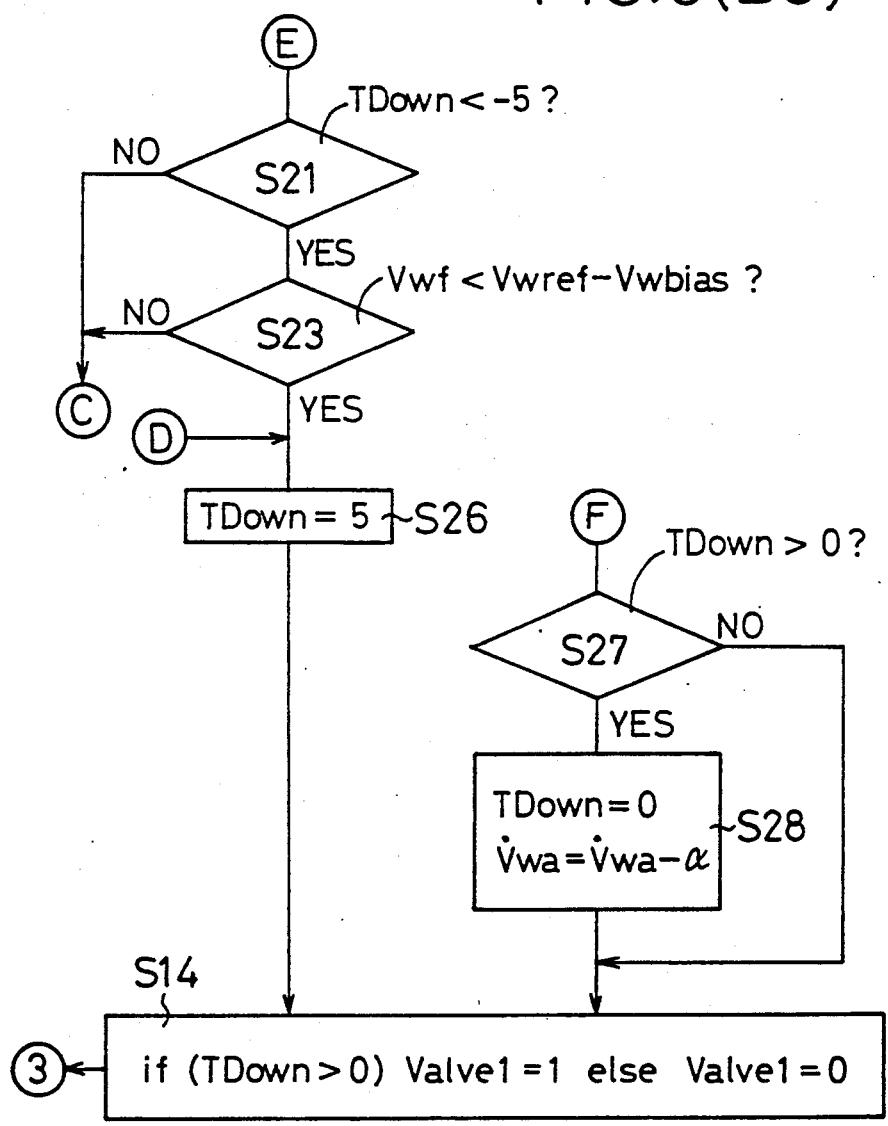

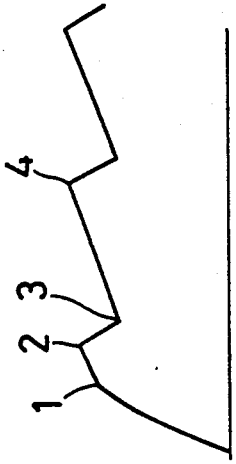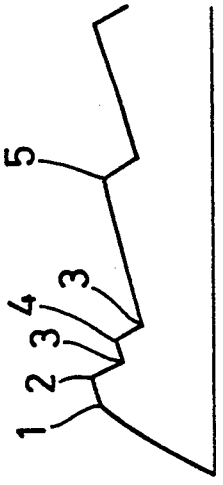
FIG.4(a) HIGH-$\mu$ ROAD SURFACE
FIG.4(b) MEDIUM TO LOW-$\mu$ ROAD SURFACE (SUDDEN DECREASE OF $\mu$)

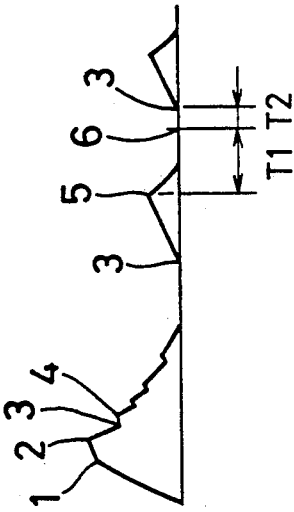
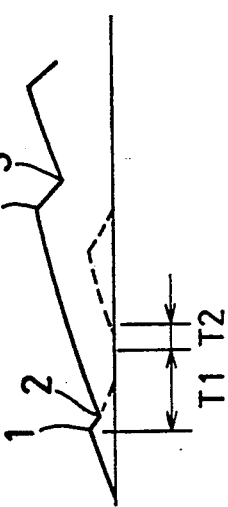
FIG. 4(c) EXTREMELY LOW-μ ROAD SURFACE (SUDDEN DECREASE OF μ)
FIG. 4(d) CHANGING PRESSURE DECREASE TO PRESSURE INCREASE (SUDDEN INCREASE OF μ)

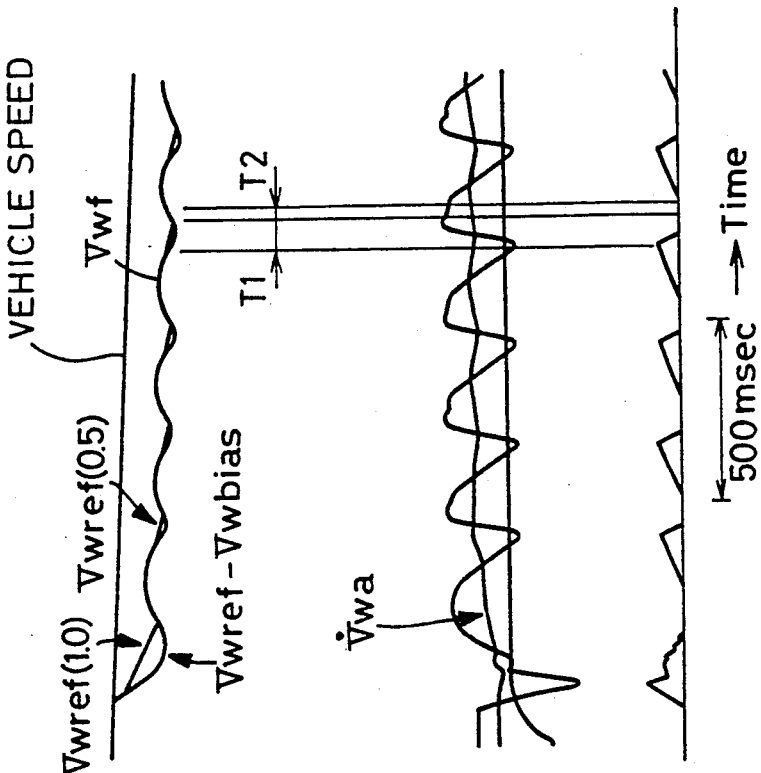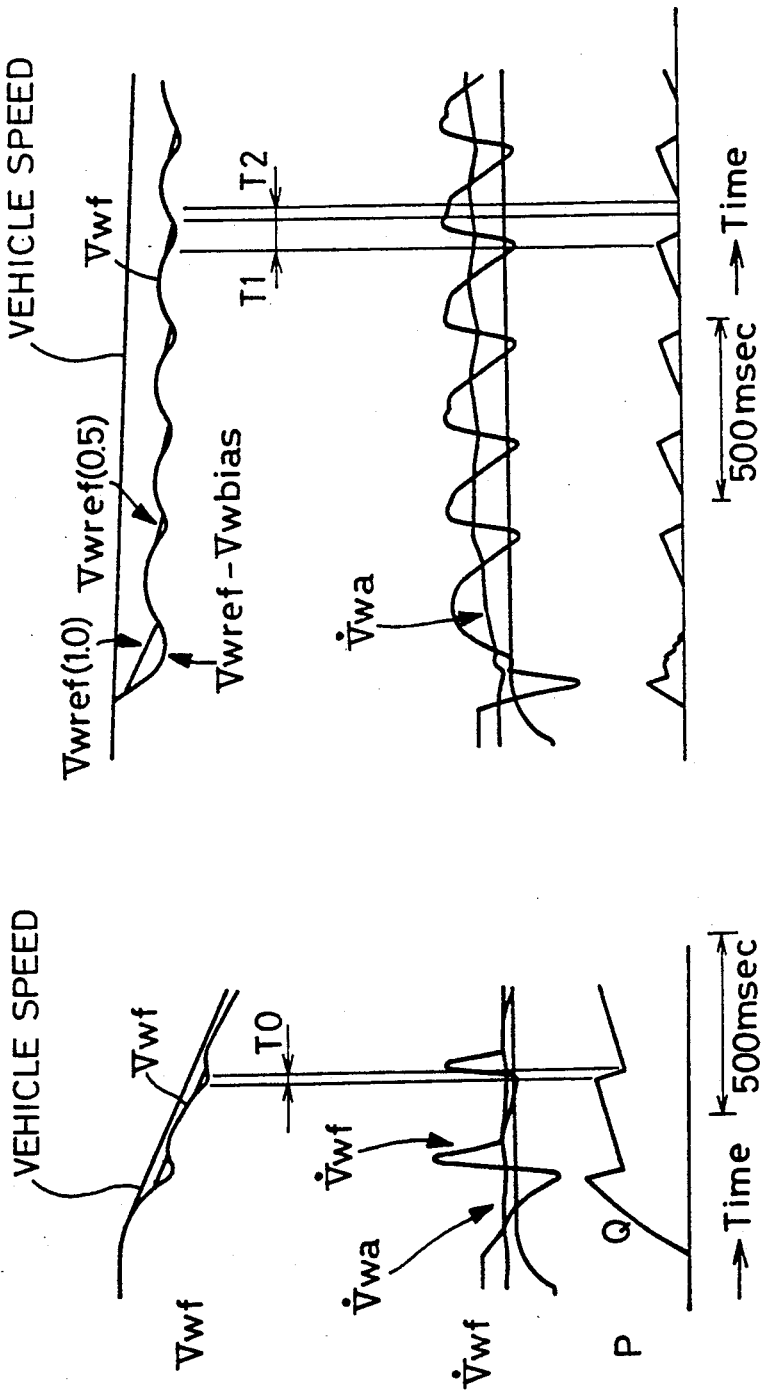

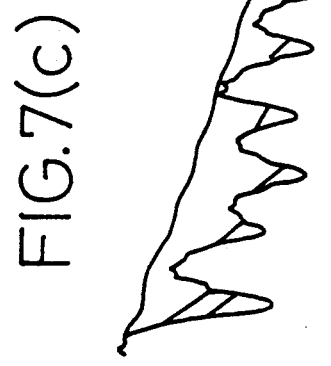
FIG.7(a)
FIG.7(b)
FIG.7(c)
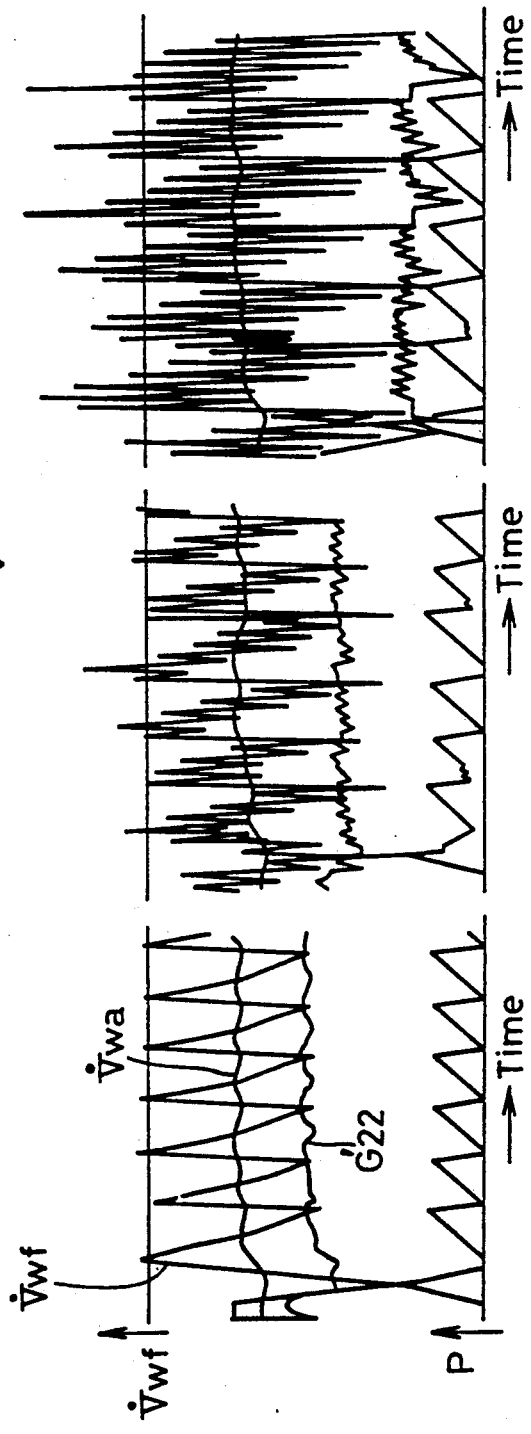

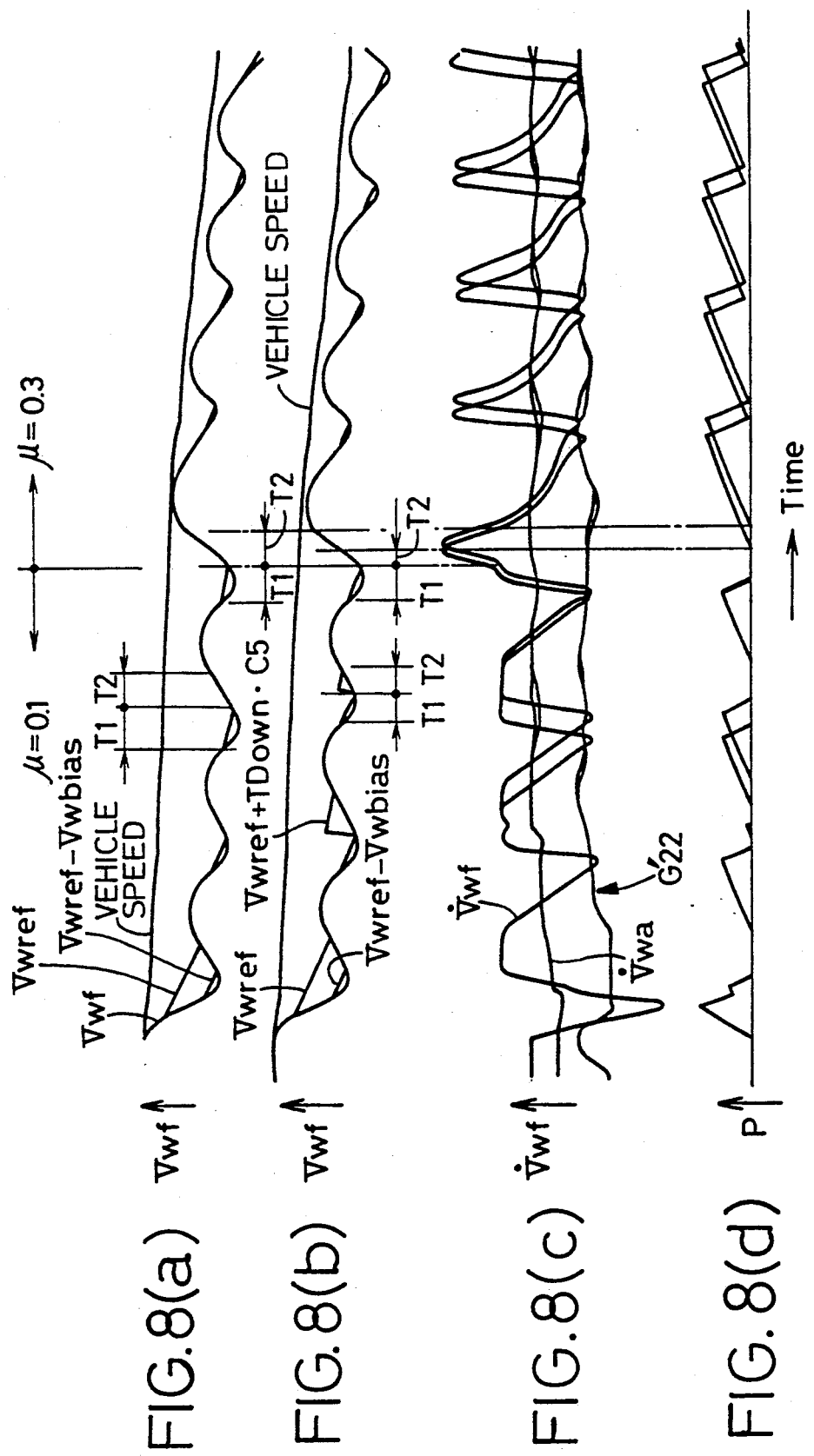

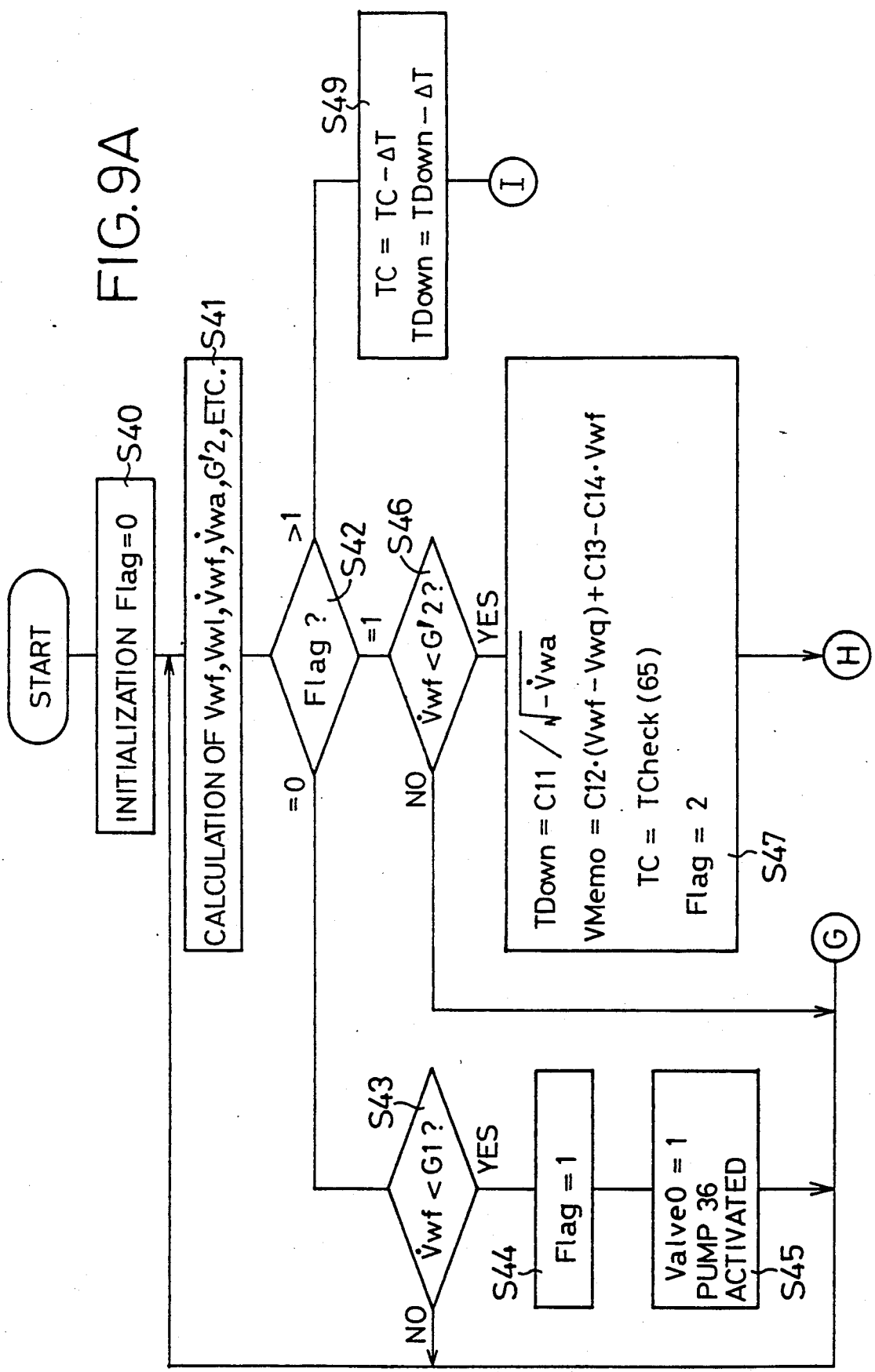

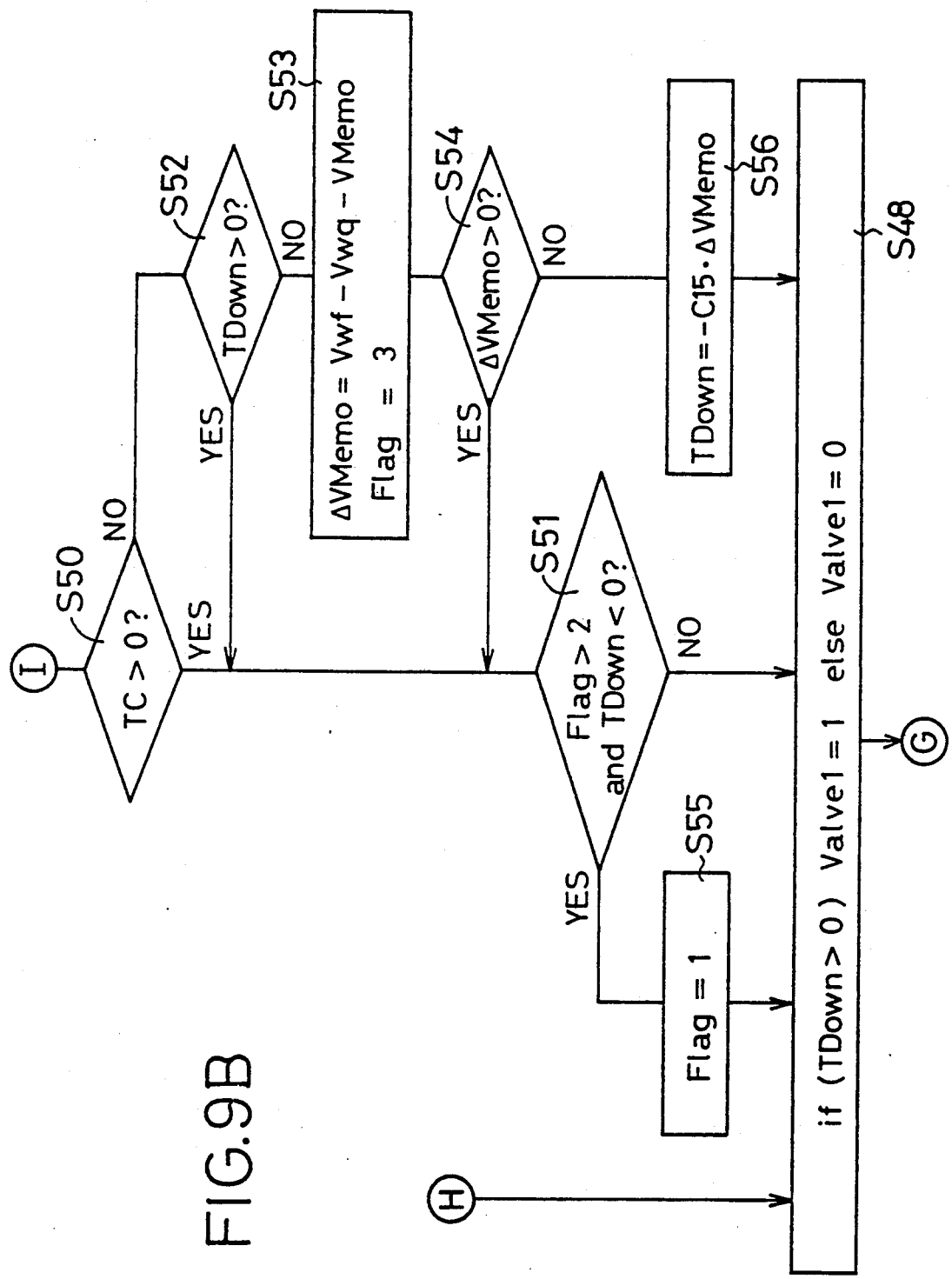

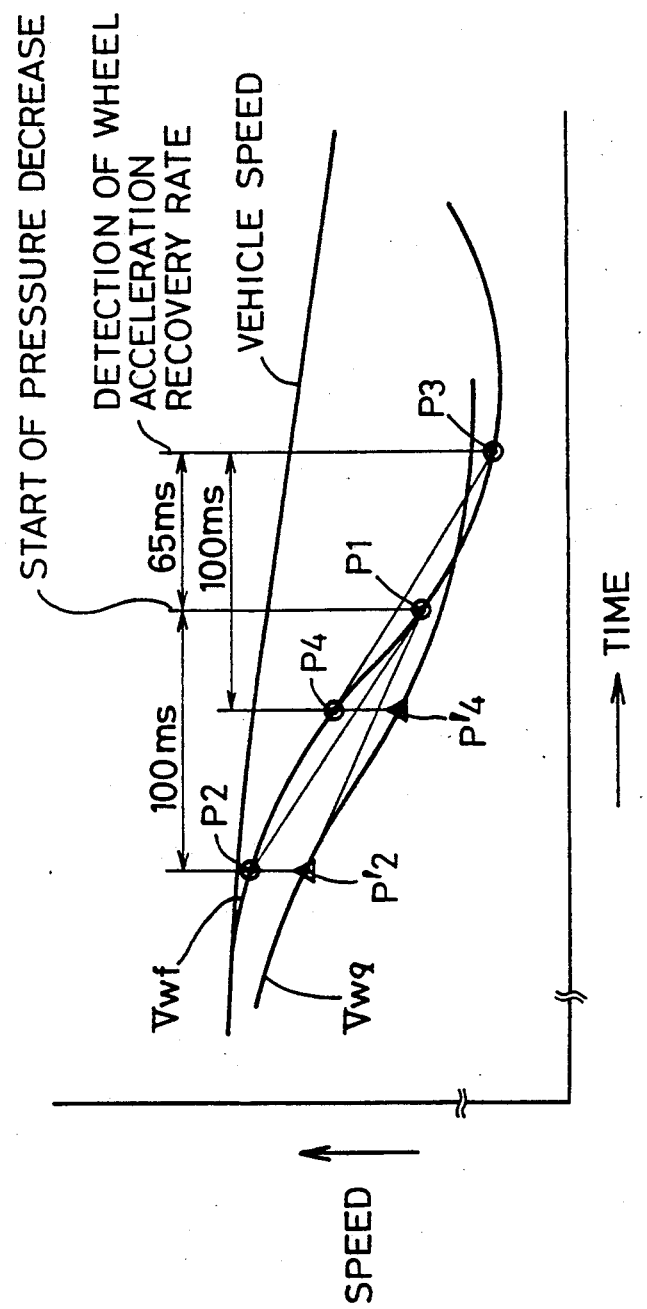

ANTI-LOCK BRAKE CONTROL APPARATUS INCLUDING MEANS FOR DETECTING AVERAGE WHEEL ACCELERATION FOR DETERMINING BRAKE PRESSURE DECREASE TIME

BACKGROUND OF THE INVENTION

1. Field of the Invention

The present invention relates to a control apparatus for controlling a hydraulically operated anti-lock brake system for a motor vehicle, so as to prevent braked wheels from excessively slipping on a road surface.

2. Discussion of the Prior Art

An anti-lock or anti-skid brake control apparatus is generally constructed to include (a) a pressure regulating valve device disposed between a hydraulic pressure source and brake cylinders of wheel brakes provided to apply brake to vehicle wheels, for controlling the brake fluid pressures in the brake cylinders, (b) slip detecting means for detecting a slip of each wheel, and (c) control means for controlling the pressure regulating valve device based on the output signal of the slip detecting means, so as to prevent excessive slipping of the wheels under braking. The degree of slip of each vehicle wheel is represented by a difference between the running speed of the vehicle and the rotating speed of the relevant wheel, or a ratio of this difference to the vehicle speed. Alternatively, the slip of the wheel is represented by a deceleration value (negative acceleration value) of the wheel.

An example of the pressure regulating valve device is disclosed in U.S. Pat. No. 4,668,024, which is a three-position valve having a pressure-hold position for maintaining the pressure in the brake cylinder, as well as a pressure-increase and a pressure-decrease position for increasing and decreasing the brake cylinder pressure, respectively. Another type of the pressure regulating valve device is disclosed in U.S. Pat. No. 4,842,343, which is a combination of a directional control valve for increasing and decreasing the brake cylinder pressure, and a shut-off valve for changing the rate of flow of the fluid into and from the brake cylinder, so that the brake cylinder pressure is controlled in a selected one of four modes, i.e., rapid increase mode, slow increase mode, rapid decrease mode and slow decrease mode.

The known pressure regulating valve devices as described above are necessarily complicated in construction and accordingly expensive. While the use of a two-position directional control valve having only the pressure-increase and pressure-decrease positions may be a solution to this problem, it is not easy to adequately control the two-position valve. Described more specifically, the brake cylinder pressure should usually be decreased at a rate higher than the rate at which the pressure is increased. In the absence of a pressure-hold or slow-decrease position, the two-position directional control valve is not capable of lowering the rate of decrease in the brake cylinder pressure for a terminal portion of the pressure-decrease period prior to resuming an increase in the brake cylinder pressure. This incapability of lowering the pressure-decrease rate results in an excessive decrease of the brake cylinder pressure, due to a control delay, if the valve is switched to the pressure-increase position when a sufficient degree of reduction in the wheel slip ratio or a symptom of such sufficient reduction in the slip ratio is actually detected. In other words, the two-position pressure regulating valve is difficult to control for obtaining an optimum amount of reduction in the brake cylinder pressure during the anti-lock brake pressure regulating operation.

SUMMARY OF THE INVENTION

It is therefore a first object of the present invention to provide an anti-lock brake control apparatus for a motor vehicle, which uses a comparatively inexpensive two-position directional control valve, yet permitting optimum pressure regulation control of a wheel brake cylinder by suitably determining the length of time for which the valve is placed in the pressure-decrease position to reduce the brake cylinder pressure.

A second object of the invention is to provide such an anti-lock brake control apparatus that meets the first object, for a wide range of the friction coefficient of the road surface on which brake is applied to the vehicle.

A third object of this invention is to provide such an anti-lock brake control apparatus that meets the second object and has a sufficiently high degree of operating reliability.

The first object may be achieved according to the principle of the present invention, which provides an anti-lock brake control apparatus for controlling a fluid pressure in a brake cylinder provided for braking a wheel of a vehicle, comprising: (a) a two-position directional control valve disposed between the brake cylinder and a hydraulic pressure source, and having a pressure-increase position and a pressure-decrease position for increasing and decreasing the pressure in the brake cylinder, respectively; (b) slip detecting means for detecting a slip condition of the wheel; (c) control means responsive to the slip detecting means, for controlling the directional control valve so as to prevent excessive slipping of the wheel; (d) acceleration average detecting means for obtaining an average value of an acceleration of the wheel during a period until the slip condition detected by the slip detecting means deteriorates to a predetermined reference condition; and (e) pressure decrease time determining means for determining a pressure decrease time substantially in reverse proportion to the average value of acceleration of the wheel which is obtained by the acceleration average detecting means when the slip has deteriorated to the reference condition, and supplying the control means with the determined pressure decrease time.

In the anti-lock brake control apparatus of the present invention as described above, when the slip condition of the wheel has deteriorated to the reference condition which necessitates the commencement of reduction in the pressure in the brake cylinder, the directional control valve is controlled by the control means to reduce the brake cylinder pressure for the pressure decrease time T0 which is determined substantially in reverse proportion to the average value of the wheel acceleration obtained during a period from the moment of detection of the slip of the wheel to the moment when the slip condition has deteriorated to the reference condition.

The average wheel acceleration value during the above-identified period represents the friction coefficient of the road surface. That is, when the average wheel acceleration value is relatively high, the friction coefficient of the road surface is accordingly high, and the brake cylinder pressure is accordingly high. The amount of decrease in the brake cylinder pressure obtained with the directional control valve placed in the pressure-decrease position for a given length of time increases with an increase in the brake cylinder pressure at that point of time. It is desired, however, that the amount of decrease in the brake cylinder pressure for each anti-lock pressure decrease operation be held constant, irrespective of the brake cylinder pressure at the time of the pressure decrease operation. Therefore, the pressure decrease time determined substantially in reverse proportion to the average wheel acceleration value assures a constant amount of reduction in the brake cylinder pressure for each pressure decrease operation, irrespective of the current brake cylinder pressure or the current friction coefficient of the road surface. In other words, an optimum pressure decrease time of the brake cylinder is determined according to the present invention, depending upon the condition at the time of starting the anti-lock pressure decrease operation, rather than the pressure decrease operation is terminated based on the actual detection that the wheel slip has been eliminated or begins to be reduced.

The present anti-lock brake control apparatus which uses the comparatively inexpensive two-position directional control valve as the pressure regulating valve device is available at a comparatively low cost of manufacture, but is capable of adequately controlling the brake cylinder pressure, irrespective of the brake cylinder pressure and the friction coefficient of the road surface at the time of the anti-lock pressure decrease operation.

It is noted that where the wheel is a front wheel of the vehicle whose load inherently increases upon brake application to the vehicle, the brake cylinder pressure is almost proportional to the average wheel acceleration value over a wide range of the pressure. Hence, the pressure decrease time determined as described above is adequate for the front wheel in almost all cases. However, the load of a rear wheel of the vehicle upon brake application decreases with an increase in the friction coefficient of the road surface, and the amount of reduction in the brake cylinder pressure tends to be insufficient if the friction coefficient exceeds a certain limit, that is, if the absolute value of the average wheel acceleration exceeds a certain limit and the reciprocal of that absolute value (which determines the pressure decrease time) is smaller than a certain limit. In this respect, it is required to provide a permissible lower limit of the pressure decrease time for the rear wheel, to prevent the insufficient amount of reduction in the brake cylinder pressure for the rear wheel.

The reference condition used to determine an amount or ratio of the wheel slip which necessitates reduction in the brake cylinder pressure may be a condition that the acceleration of the wheel has been lowered to a reference level (negative value). The use of this reference condition is desirable to detect the increasing tendency of the wheel slip at a relatively early point of time during the relevant brake application. The average value of the wheel acceleration during the specified period is obtained as a parameter which represents the acceleration of the vehicle during the brake application. In this sense, it is possible to obtain the average value of the wheel acceleration for a suitable period after a braking effect starts to appear, for example, after the wheel acceleration has decreased to a comparatively small value (negative value). However, this arrangement requires detecting the beginning of the period during which the wheel acceleration values are sampled to obtain the average value. In the control apparatus according to the present invention, the average value of the wheel acceleration is obtained by averaging the sampled values during the period between the moment of detection of the wheel slip condition and the moment at which the slip condition has deteriorated to the reference condition. To improve the accuracy of the obtained average value of the wheel acceleration to represent the vehicle acceleration during the brake application, it is desired to obtain the average value of the wheel acceleration by giving weights to the sampled values such that the weights increase with time.

In the case where the wheel acceleration is used as the reference condition to detect the amount of the wheel slip that necessitates the commencement of reduction in the brake cylinder pressure, the anti-lock brake control apparatus may further comprise rapid pressure-increase mode establishing means for resetting the determined pressure decrease time and switching the directional control valve to the pressure-increase position to establish a rapid pressure increase mode, when the acceleration of the wheel exceeds another reference level higher than the above-indicated reference level. According to this arrangement, adjusting means is provided for adjusting the average value of the acceleration of the wheel to a higher value, when the rapid pressure increase mode is established.

The anti-lock brake control apparatus may further comprise rotation detecting means for detecting one of a rotating speed and the acceleration of the wheel, and a digital filter for eliminating a higher harmonic of the above-indicated one of the rotating speed and acceleration of the wheel detected by the rotation detecting means.

Further, the apparatus may further comprise noise quantifying means for quantifying a noise included in the acceleration of the wheel detected by the rotation detecting means, and reference condition adjusting means for adjusting the reference condition depending upon the noise quantified by the noise quantifying means.

The pressure decrease time determining means may comprise means for allowing a predetermined time duration before determining whether the slip condition of the wheel has deteriorated to the reference condition, after the control means switches the directional control valve from the pressure-decrease position to the pressure-increase position.

The present anti-lock brake control apparatus may further comprise a shut-off valve disposed between the brake cylinder and the hydraulic pressure source in parallel connection with the directional control valve, a flow restrictor disposed between the hydraulic pressure source and the directional control valve, and slow pressure-increase mode establishing means for normally holding the shut-off valve in an open position, and switching the shut-off valve to a closed position when the slip condition of the wheel has deteriorated for the first time to another reference condition representative of a slip condition improved over that represented by the above-indicated reference condition. With the shut-off valve placed in the closed position, a slow pressure increase mode is established to reduce a rate of increase in the brake cylinder pressure to a value lower than that determined while the shut-off valve is placed in the open position.

The anti-lock brake control apparatus may further comprise pressure-increase mode establishing means for switching the directional control valve to the pressure-increase position to establish a pressure increase mode, when the slip condition of the wheel has improved to a second reference condition upon expiration of the pressure decrease time, and further comprise additional slow pressure-decrease mode establishing means for placing the directional control valve alternately in the pressure-increase and pressure-decrease positions to establish an additional slow pressure decrease mode, when the slip condition of the wheel has not improved to the second reference condition upon expiration of the pressure decrease time. The additional slow pressure decrease mode is maintained until the slip condition has improved to the second reference condition. In this case, suitable means may be provided for holding the directional control valve in the pressure-decrease position to establish an additional rapid pressure-decrease mode, when the slip condition of the wheel upon expiration of the pressure decrease time is deteriorated over a third reference condition representative of a slip condition deteriorated over that represented by the second reference condition. The additional rapid pressure-decrease mode is maintained until the slip condition has improved to the third reference condition.

The second object of the invention described above may be achieved according to one preferred arrangement of the present invention wherein the reference condition, the pressure decrease time, and the pressure decrease time determining means are defined as a first reference condition, a first pressure decrease time and first pressure decrease time determining means, respectively, and wherein the apparatus further comprises second pressure decrease time determining means, operable when the slip condition of the wheel has improved to a second reference condition, for determining a second pressure decrease time and supplying the control means with the determined second pressure decrease time, if a time duration between a moment when the slip condition of the wheel has deteriorated to the first reference condition and a moment when the slip condition has improved to the second reference condition is longer than a reference time. The second pressure decrease time determining means determines the second pressure decrease time such that the second pressure decrease time increases with an increase in a difference between the time duration and the reference time. In this case, the second reference condition may be a condition that the detected rotating speed of the wheel has increased to a reference level, which is lower than the vehicle running speed by a suitable amount.

In the above arrangement, the directional control valve is controlled by the control means to reduce the brake cylinder pressure for the first pressure decrease time T0. However, the second pressure decrease time T2 is determined, if the time duration T1 between the moment when the slip of the wheel has deteriorated to the first reference condition and the moment when the wheel slip condition has improved to a second reference condition is longer than a reference time C3. The second pressure decrease time T2 is determined so as to increase with an increase in a difference between the time duration T1 and the reference time C3. In this case, the brake cylinder pressure is lowered for the second pressure decrease time T2 following the time duration T1.

It is comparatively easy to adequately determine the first pressure decrease time T0 to assure an optimum amount of reduction in the brake cylinder pressure, as long as the friction coefficient μ of the road surface falls within a range of about 1.0–0.15. However, it is not easy to adequately determine the first pressure decrease time when the friction coefficient is lower than 0.15. In the above arrangement, when the wheel slip condition has improved to the second reference condition, a determination is made as to whether the time duration T1 is longer than the reference time C3. If the time duration T1 is longer than the reference value C3, then the second pressure decrease time T2 is determined depending upon the time duration T1, so that the total pressure decrease time is equal to T1+T2. Thus, the total pressure decrease time may be adequately determined. It is noted that the time duration T1 has a close relationship with the friction coefficient μ of the road surface. By determining the second pressure decrease time T2 so as to increase with the difference between T1 and C3 (for example, so as to be in direct proportion to the difference), the total pressure decrease time (T1+T2) can be adequately determined for an optimum amount of reduction in the brake cylinder pressure even while the vehicle is running on a road surface having an extremely low friction coefficient.

The second object described above may also be achieved according to an alternative arrangement of the invention, wherein the reference condition and the pressure decrease time are defined as a first reference condition and a first pressure decrease time, respectively, and wherein the anti-lock brake control apparatus further comprises means for adjusting a second reference condition, when the slip condition of the wheel has improved to the second reference condition, if a time duration between a moment when the slip condition of the wheel has deteriorated to the first reference condition and a moment when the slip condition has improved to the second reference condition is longer than a reference time. The second reference condition adjusting means adjusts the second reference condition such that the adjusted second reference condition changes with a difference between the time duration and the reference time.

In either of the above two arrangements, the total pressure decrease time may be adequately determined so as to permit an optimum amount of reduction in the brake cylinder pressure, even if the friction coefficient of the road surface varies over a wide range, or even when the brake is applied to the vehicle while the friction coefficient of the road surface is extremely low.

The third object described above may be achieved according to a further preferred arrangement of the invention, wherein the reference condition, the pressure decrease time, and the pressure decrease time determining means are defined as a first reference condition, a first pressure decrease time and first pressure decrease time determining means, respectively, and wherein the anti-lock brake control apparatus further comprising: recovery detecting means for detecting a recovery strength of the acceleration of the wheel when a predetermined time has passed after the control means is supplied with the first pressure decrease time; and second pressure decrease time determining means for determining a second pressure decrease time and supplying the control means with the determined second pressure decrease time, when the recovery strength detected by the recovery detecting means is smaller than a reference value. The second pressure decrease time determining means determines the second pressure decrease time such that the second pressure decrease time increases with an increase in a difference between the detected recovery strength and the reference value.

In the above arrangement of the present invention, the recovery strength of the wheel acceleration is detected when the predetermined time has passed after the decrease in the wheel cylinder pressure is started. Based on the detected recovery strength, the second pressure decrease time is determined. In the above arrangements wherein the second pressure decrease time is determined when the wheel slip condition has improved to the second reference condition, there may arise a delay or failure in detecting that the wheel slip condition has improved to the second reference condition. In this respect, some special processing is required in order to increase the reliability of the apparatus. In the present arrangement, the second pressure decrease time is determined at a predetermined fixed point of time after the pressure decrease operation is started, i.e., after the predetermined time has passed after the initiation of the pressure decrease operation. Thus, the present arrangement assures improved reliability in determining the time during which the brake cylinder pressure is reduced.

The predetermined time is desirably set to be sufficiently long so that the recovery strength of the wheel acceleration is smaller than the reference value upon expiration of the predetermined time, in all cases except where the friction coefficient of the road surface is extremely low, i.e., lower than 0.15.

The recovery detecting means may be adapted to detect the recovery strength as a difference between a first acceleration value of the wheel detected when the slip condition of the wheel has deteriorated to the first reference value, and a second acceleration value of the wheel detected when the predetermined time has expired. Preferably, the first acceleration value is an average value during the period between the start of the pressure decrease operation and the moment when the wheel slip condition has reached the first reference condition, while the second acceleration value is an average value during a suitable terminal portion of the above-indicated predetermined time. For example, a digital filter is provided for eliminating a higher harmonic of the detected rotating speed of the wheel, and smoothing means is provided for smoothing the detected rotating speed by a time constant larger than a time constant of the digital filter. In this case, the recovery detecting means may be adapted to detect each of the first and second acceleration values as a difference between a filtered value produced by the digital filter, and a long-time smoothed value of the rotating speed which is smoothed by the smoothing means. To reduce the influence of disturbances due to the vibrations of the vehicle wheel, the time constant of the smoothing means is preferably no less than the period of the vibrations of the wheel, which arise from periodic expansion and contraction of suspension springs for the wheel. The average of the second acceleration value may be obtained by giving weights to multiple sampled values such that the weights increase with time. The first acceleration value of the wheel may be adjusted such that the absolute value of the adjusted first acceleration increases with an increase in the rotating speed of the wheel.

BRIEF DESCRIPTION OF THE DRAWINGS

The above and optional objects, features and advantages of the present invention will be better understood by reading the following detailed description of presently preferred embodiments of the invention, when considered in conjunction with the accompanying drawings, in which:

FIGS. 4(a)-4(d) shows explanatory views indicating pressure control patterns performed by the anti-lock brake control apparatus of FIG. 2;

FIGS. 5 and 6 are graphs showing changes in the wheel speed, wheel acceleration and brake cylinder pressure when the anti-lock brake control apparatus is operated during running of the vehicle on a road surface having a high friction coefficient, and on a road surface having an extremely low friction coefficient, respectively;

FIGS. 7(a), 7(b) and 7(c) are graphs showing changes in the wheel speed, wheel acceleration and brake cylinder pressure during operation of the control device where the signal indicative of the wheel acceleration includes noises;

FIGS. 8(a) through 8(d) are graphs illustrating an advantage obtained when the optional steps indicated in dashed lines in FIG. 3(B) are added;

FIGS. 9A and 9B show a flow chart illustrating a control program used in another embodiment of the invention adapted to attain the first and third objects indicated above;

FIG. 10 is a graph for explaining the principle of obtaining a recovery strength of the wheel acceleration from the execution of the control program of the flow chart of FIG. 9.

DETAILED DESCRIPTION OF THE PREFERRED EMBODIMENTS

Figure 1:
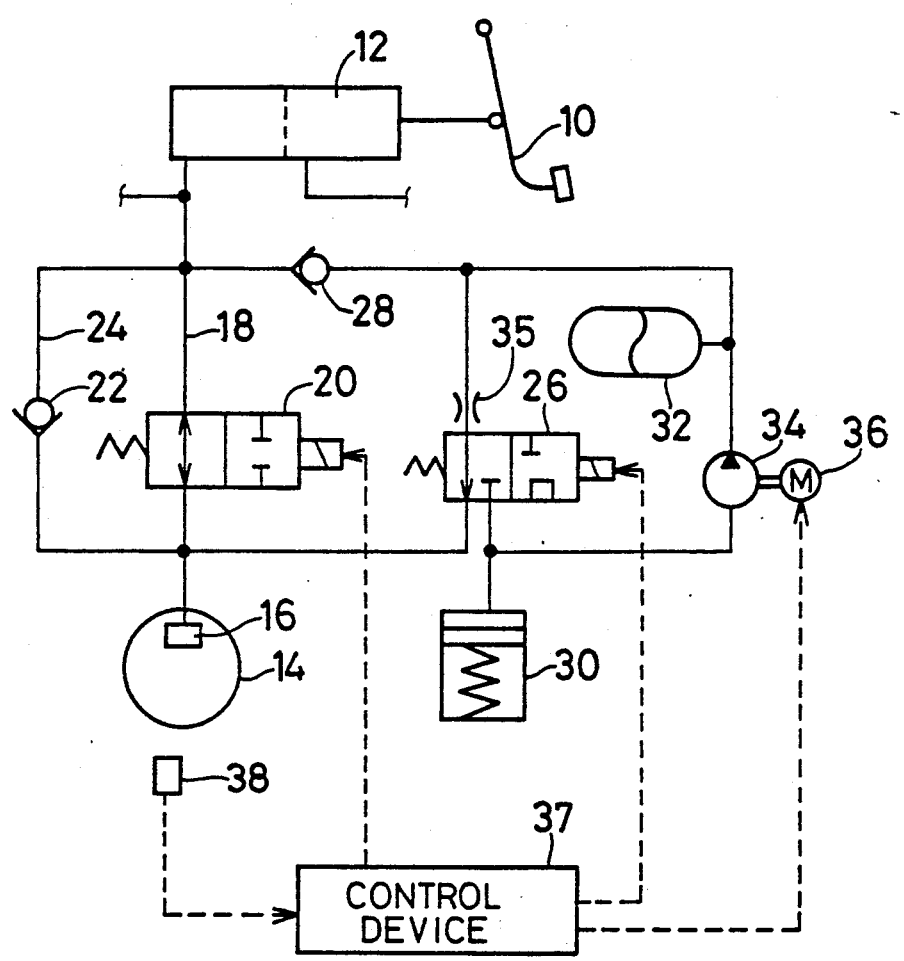
FIG. 1 is a schematic diagram showing part of a hydraulically operated brake system for a motor vehicle, which incorporates one embodiment of an anti-lock brake control apparatus adapted to attain the first and second objects described above.

Referring first to FIG. 1, there is shown a part of a hydraulically operated anti-lock brake system for a motor vehicle, which includes one embodiment of the anti-lock brake control apparatus of the present invention adapted to attain the first and second objects indicated above. In FIG. 1, reference numeral 10 denotes a brake pedal which serves as a brake operating member for applying brake to the vehicle. In response to an operation of the brake pedal 10, a brake fluid is pressurized in a master cylinder 12, such that the pressure of the fluid in the master cylinder 12 increases with an increase in the operating force acting on the brake pedal 10.

The master cylinder 12 is a tandem type having two mutually independent pressure chambers disposed in tandem, which are connected to a front wheel brake circuit and a rear wheel brake circuit, respectively, independently of each other. FIG. 1 shows only one of four hydraulic arrangements for respective four wheels of the vehicle, which one arrangement includes a brake cylinder 16 for wheel 14. The brake cylinder 16 for activating a brake for the wheel 14 is hydraulically connected to the master cylinder 12 through a main fluid passage 18.

The main fluid passage 18 is provided with a shut-off valve 20 connected part way through its length. The shut-off valve 20 is a solenoid-operated valve which has an open position for fluid communication between the master cylinder 12 and the brake cylinder 16, and a closed position for disconnection of the brake cylinder 16 from the master cylinder 12. This valve 20 is normally placed in its open position.

A by-pass passage 24 is provided in parallel connection with the main fluid passage 18. The by-pass passage 24 has a check valve 22 which permits the brake fluid to be rapidly returned from the brake cylinder 16 to the master cylinder 12 when the braking force is released from the brake pedal 10.

A circuit including a directional control valve 26 and a check valve 28 connected in series is connected in parallel to the main fluid passage 18. The check valve 28 permits the brake fluid to flow in a direction from the master cylinder 12 toward the directional control valve 26, and inhibits the fluid flow in the opposite direction. The directional control valve 26 is a solenoid-operated valve having a pressure-decrease position for fluid communication of the brake cylinder 16 with a reservoir 30 to lower the pressure in the brake cylinder 16, and a pressure-increase position for fluid communication of the brake cylinder 16 with an accumulator 32 to increase the pressure in the brake cylinder 16.

The brake fluid discharged from the brake cylinder 16 into the reservoir 30 with the valve 16 operated to the pressure-decrease position is pumped by a pump 34 and is stored in the accumulator 32. The set pressure of the fluid stored in the accumulator 32 is slightly higher than the highest pressure that can be produced by the master cylinder 12. Between the check valve 28 and the directional control valve 26, there is provided a flow restrictor 35 which restricts the rate of flow of the fluid from the accumulator 32 toward the brake cylinder 16 when the valve 26 is placed in the pressure-increase position. The fluid flow rate restricted by the restrictor 35 is 1/5 to 1/30 of the rate of flow of the fluid through the valve 26 when the valve 26 is placed in the pressure-decrease position.

The shut-off valve 20, directional control valve 26 and motor 36 for driving the pump 34 are controlled by a control device 37. To this control device 37, there is connected a speed sensor 38 adapted to detect the rotating speed of the wheel 14, such that the sensor 38 produces one pulse for a predetermined angle of rotation of the wheel 14.

Figure 2:
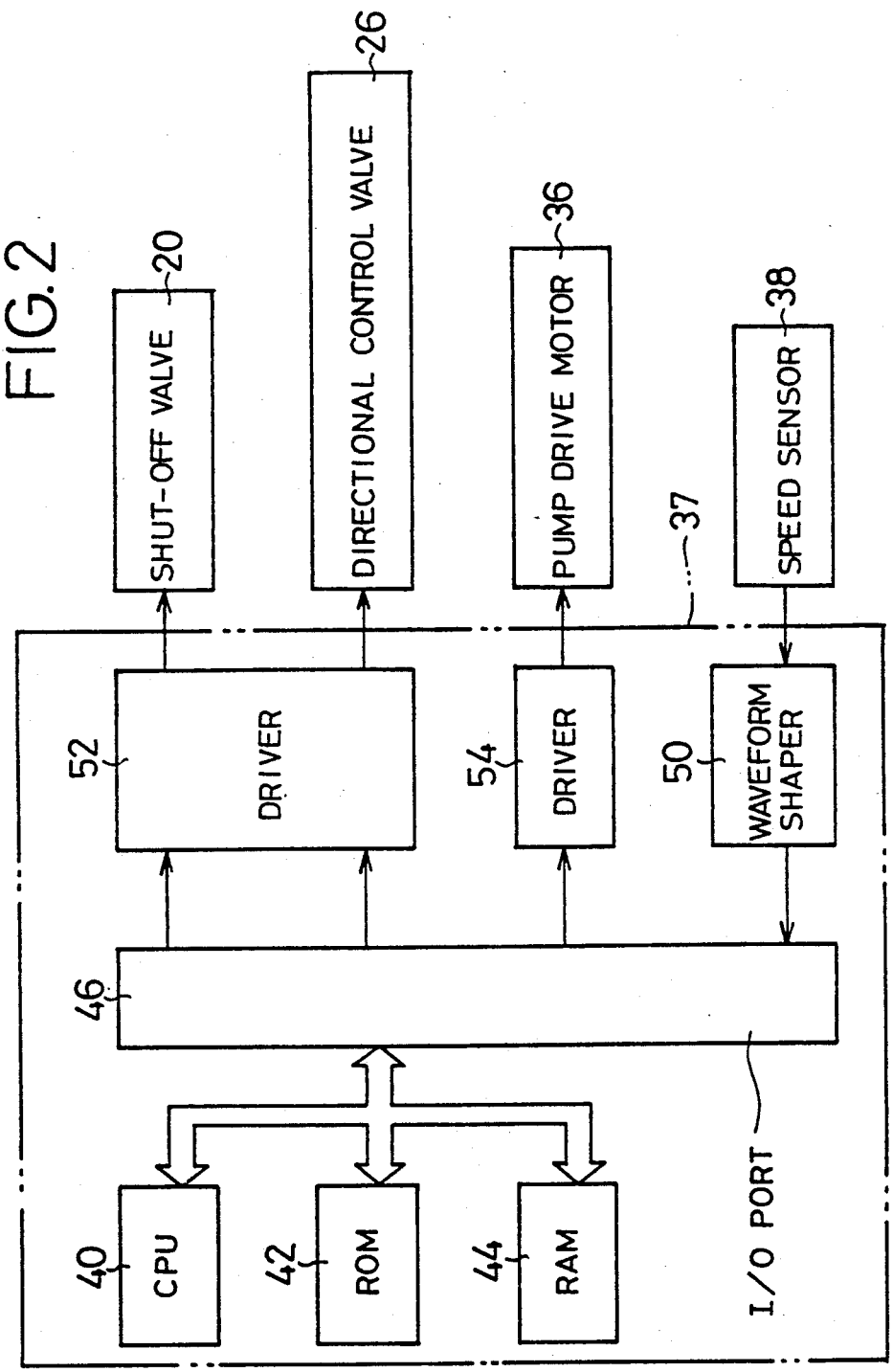
FIG. 2 is a block diagram illustrating an arrangement of the control device of FIG. 1.

Referring to FIG. 2, the control device 37 is principally constituted by a microcomputer which includes a CPU (central processing unit) 40, a ROM (read-only memory) 42, a RAM (random-access memory) 44, and an I/O (input/output) port 46. To the I/O port 46 are connected the speed sensor 38 through a waveform shaper 50, and the solenoids of the shut-off and directional control valves 24, 26 through a driver 52. Further, the pump drive motor 36 is connected to the I/O port 46 through a driver 54.

The ROM 42 stores various control programs such as the control programs represented by the flow charts of FIGS. 3(A) and 3(B). The control programs of FIGS. 3(A) and 3(B) are adapted to control the pressure in the brake cylinder 16 of the wheel 14. The brake cylinders for the other wheels may be controlled by similar control programs.

There will be described an operation of the present anti-lock brake control apparatus, by reference to the flow charts of FIGS. 3(A) and 3(B). Sets of characters or symbols used in these figures are defined as follows:

Time: Cumulative time
Time1, Time2: Calculation intervals, each defined by successive two calculation commands generated at a predetermined frequency, more specifically, a time duration between the moments of fall of the adjacent two pulses which are generated by the waveform shaper 50 immediately before the appropriate adjacent two calculation commands
Time1: Leading one of the adjacent two calculation intervals
Time2: Trailing one of the adjacent two calculation intervals
Pulse: Number of pulses of the waveform shaper 50 generated during "Time2"
Tdown: Pressure decrease time of the valve 26
Vw1: Wheel speed (angular velocity) calculated from "Pulse" during "Time1"
Vw2: Wheel speed (angular velocity) calculated from "Pulse" during "Time2"
$\Delta$Vw: Buffer value of wheel speed
Vwf: Filter value of wheel speed
$\dot{V}$w: Instantaneous value of wheel acceleration (angular acceleration)
$\Delta\dot{V}$w: Buffer value of wheel acceleration (angular acceleration)
$\dot{V}$wf: Filter value of wheel acceleration (angular acceleration)
$\dot{V}$wa: Long-time average value of $\dot{V}$wf
Noise1: Low-pass filtered value of wheel acceleration
Noise2: Low-pass filtered value of absolute value of "Noise1"
Kv: Wheel speed determining factor
Ka: Wheel acceleration determining factor
K1, K2, K3: Low-pass filter factors
K4, K5, K6: Noise quantifying factor
G0: Reference wheel acceleration for detecting start of braking G1: Reference wheel acceleration for starting anti-lock brake pressure control
G21: Reference wheel acceleration for starting first pressure decrease of the brake cylinder 16
G22: Reference wheel acceleration for starting second pressure decrease of the brake cylinder 16
G3: Reference for positive peak of wheel acceleration
G4: Reference wheel acceleration for starting forced rapid pressure increase of the brake cylinder 16
G'22: G22 adjusted by the magnitude of noise
G'4: G4 adjusted by the magnitude of noise
K7-K12: Factors for adjusting the reference values by noise
Flag: Control mode flag
 =0: Prior to starting anti-lock brake pressure control
 =1: Stand-by until wheel slip ratio exceeds a limit
 =2: During anti-lock brake pressure control
 =3: During brake pressure control on extremely low-$\mu$ road
Slip: Desired wheel slip ratio
Valve0: Control command for shut-off valve 20
 =0: OPEN
 =1: CLOSED
Valve1: Control command for directional control valve 26
 =0: PRESSURE INCREASE =1: PRESSURE DECREASE
Vbase: Desired wheel speed with permissible slip ratio
Vwref: Reference wheel speed
Vwbias: Bias value of Vwref
ΔVwref: Reducing gradient of Vwref
Tmemo: Moment of start of pressure decrease of the brake cylinder 16
C1-C5: Constants for calculating the pressure decrease time of the brake cylinder 16
$\dot{V}$wa: Long-time average value of $\dot{V}$wf
α: Bias value of $\dot{V}$wa In the flow charts of FIGS. 3(A) and 3(B), step S1 is executed, upon application of power to the control device 37, to initialize the control device 37, for resetting various values as indicated within the block of S1. In particular, the "Valve0" and "Valve1" are reset to zero, and these values ar read by execution of an interruption routine (not shown) by the CPU 40, whereby the shut-off valve 20 is switched to the open position, and the directional control valve 26 is switched to the pressure-increase position, so that the pressure of the master cylinder 12 may be applied to the brake cylinder 16.

Then, the control flow goes to step S2 in which the "Time2" and Vw2 (currently equal to "0") are set as the "Time1" and Vw1, and the "Time2" and "Pulse" are read by the CPU 40, to calculate the instantaneous value Vw2 of the speed of the wheel 16 according to the following equation (1):

$$Vw2 = Kv \cdot Pulse/Time2 \qquad (1)$$

Step S2 is followed by step S3 to determine whether the "Time1" is equal to zero or not, that is, whether step S2 has been executed two times or more, or not. In the first control cycle, an affirmative decision (YES) is obtained, and the control flow returns to step S2. Thus, the values "Time1", "Time2", Vw1 and Vw2 are obtained. Then, the control flow goes to step S4.

In step S4, arithmetic operations are performed according to the following equations (2) through (13):

$$Time = Time + Time2 \qquad (2)$$

$$\Delta T = (Time1 + Time2)/2 \qquad (3)$$

$$\dot{V}w = Ka(Vw2 - Vw1)/\Delta T \qquad (4)$$

$$\Delta Vw = \Delta Vw \cdot K1 + (Vw2 - Vwf) \qquad (5)$$

$$Vwf = Vwf + \Delta Vw \cdot K2 \qquad (6)$$

$$\Delta \dot{V}w = \Delta \dot{V}w \cdot K1 + (\dot{V}w - \dot{V}wf) \qquad (7)$$

$$\dot{V}wf = \dot{V}wf + \Delta \dot{V}w \cdot K2 \qquad (8)$$

$$\dot{V}wa = \dot{V}wa + (\dot{V}wf - \dot{V}wa)K3 \qquad (9)$$

$$Noise1 = Noise1 + (\Delta \dot{V}w - Noise1)K4 \qquad (10)$$

$$Noise2 = Noise2 + (|Noise1| \cdot K5 - Noise2)K6 \qquad (11)$$

$$G'22 = G22 + \dot{V}wa \cdot K7 - Noise2 \cdot K8 \qquad (12)$$

$$G'4 = G4 + Noise2 \cdot K9 \qquad (13)$$

pp The equations (5) and (6), and the equations (7) and (8) correspond to digital filters for calculating the wheel speed and wheel acceleration, respectively. These filters are a sort of Butterworth filter for averaging by adding weights to the sampled values such that the weights increase with time. The equations (10) and (11) correspond to low-pass filters for the ΔVw and the absolute value of the "Noise1". More particularly, the value "Noise2" obtained as a result of the arithmetic operation according to the equation (11) is a quantified value of the noise included in the wheel acceleration value $\dot{V}$w. Further, the operation according to the equation (12) is effected to calculate an adjusted value G'22 of a predetermined reference wheel acceleration value G22 for starting the pressure decrease of the brake cylinder 16. The adjusted value G'22, which is actually used, is obtained by adjusting the reference value G22 depending upon the value "Noise2". The value G'22 (negative value) decreases (its absolute value increases) with an increase in the value of the noise.

The value K7 may be a value between "0" and "1". The operation according to the equation (13) is effected to adjust the reference wheel acceleration value G4 for starting a predetermined amount of a forced rapid pressure increase of the brake cylinder 16. Namely, an actually used value G'4 is obtained by adjusting the value G4 such that the value G'4 increases with an increase in the value of the noise.

Step S4 is followed by step S5 to check the value of the "Flag", for performing different control operations depending upon the value of the "Flag". In the first control cycle in which the "Flag" is reset to "0" in step S1, step S5 is followed by step S6 to determine whether the filtered value $\dot{V}$wf of the acceleration of the wheel 16 is smaller than the reference wheel acceleration value G0 for detecting the start of braking to the wheel 16. The reference wheel acceleration value G0 is a negative value whose absolute value is relatively small so that an affirmative decision (YES) is obtained in step S6 when a braking to the wheel 16 provides a slight effect of reducing the acceleration value of the wheel 16. When the affirmative decision is obtained in step S6, the control flow goes to step S7, to calculate the desired speed Vbase of the wheel 16, according to the following equation (14):

$$Vbase = Vwf - Vwf \cdot Slip \qquad (14)$$

Also, the value "Flag" is set to "1" in step S7, to establish the stand-by mode in which the CPU 40 continues to monitor whether the slip ratio of the wheel 16 exceeds a predetermined limit, or not. Thereafter, the pressure in the brake cylinder 16 is controlled in a selected one of different control patterns, depending upon the friction coefficient μ of the road surface, as described below.

The above-indicated different control patterns are selected depending upon the friction coefficient μ of the road surface, for the following reason:

In the present embodiment, the pressure decrease time Tdown of the brake cylinder 16 is set in step S13 substantially in inverse proportion with the long-time average value $\dot{V}$wa of the filtered value $\dot{V}$wf of the wheel acceleration, when the filtered value $\dot{V}$wf becomes smaller than the reference wheel acceleration value G21 or adjusted value G'22. The pressure decrease time Tdown thus set in step S13 is defined as a first pressure decrease time T0, which is almost suitable for the road surfaces whose friction coefficient μ is high or relatively low, but not necessarily suitable for the road surface whose friction coefficient is extremely low. For the extremely low friction coefficient μ, therefore, a second pressure decrease time T2 is obtained in step S20, so that the second pressure decrease time T2 is used thereafter, regardless of the first pressure decrease time T0. Another reason for controlling the pressure in the brake cylinder 16 in the different patterns is a need of effecting an additional slow decrease of the brake cylinder pressure, where a first pressure decrease operation for the time T0 does not permit the recovery of the once lowered speed of the braked wheel 14 to a higher level, when the brake is applied during running of the vehicle on a road surface having a medium to extremely low friction coefficient $\mu$. The different pressure control patterns will be described in detail.

Referring to FIG. 4(a), the control pattern for the road surface having a high friction coefficient $\mu$ will be described. In the figure, the numbers identifying the conditions correspond to points indicated in the graph of the control pattern, and the step numbers represent the steps of the flow chart of FIG. 3(B) for determining whether the corresponding conditions are satisfied or not.

After the value "Flag" is set to "1" in step S7, steps S2, S3, S4, S5, S8 and S9 are repeatedly executed. Step S8 is implemented to determine whether the filtered value Vwf of the speed of the wheel 14 is smaller than the desired wheel space Vbase, while step S9 is implemented to determine whether the filtered value $\dot{V}$wf of the wheel acceleration is smaller than the reference wheel acceleration G1 for starting the anti-lock brake pressure control. If an affirmative decision (YES) is obtained in step S9, step S10 is implemented to change the value "Valve0" from "0" to "1", whereby the shut-off valve 20 is switched to the closed position. As a result, the pressure produced by the master cylinder 12 is applied to the brake cylinder 16, through the check valve 28, flow restrictor 35 and directional control valve 26, so that the rate of increase in the pressure of the brake cylinder 16 is lowered. Namely, the rapid pressure increase mode is changed to the slow pressure increase mode. At the same time, the pump 34 is activated to pump up the fluid from the reservoir 30. This point of time is regarded as a point at which the anti-lock brake pressure control operation is started by the control device 37.

When the filtered value Vwf of the wheel speed becomes equal to or smaller than the desired wheel speed Vbase, step S8 is followed by step S11 to determine whether the filtered value $\dot{V}$wf of the wheel acceleration is smaller than the reference wheel acceleration G21 for starting a first pressure decrease of the brake cylinder 16, or not. As long as a negative decision (NO) is obtained in step S11, the slow pressure decrease mode is maintained with the shut-off valve 20 held in the closed position. If an affirmative decision (YES) is obtained in step S11, step S13 is executed to determine the pressure decrease time Tdown, etc.

Initially, the pressure decrease time Tdown as the first pressure decrease time T0 is calculated according to the following equation(15):

$$Tdown = -C1/(\dot{V}wa + C2) \quad (15)$$

As is apparent from the equation (15), the pressure decrease time Tdown decreases with a decrease in the long-time average value $\dot{V}$wa of the filtered value $\dot{V}$wf of the wheel acceleration. That is, since the value $\dot{V}$wa is a negative value, the pressure decrease time Tdown decreases with an increase in the absolute value of the value $\dot{V}$wa. Since the average value $\dot{V}$wa is obtained by weighting the filtered value $\dot{V}$wf of the wheel acceleration such that the weight increases with time, the average value $\dot{V}$wa corresponds to the deceleration value of the vehicle. This means that when the average value $\dot{V}$wa is relatively small, the friction coefficient $\mu$ of the road surface is accordingly low and the pressure in the brake cylinder 16 is accordingly high. The rate of decrease in the brake cylinder pressure during the pressure decrease time increases with the pressure in the cylinder 16. However, it is desired that the amount of decrease in the brake cylinder pressure per each pressure decrease operation be held constant, irrespective of the pressure in the cylinder 16. Therefore, it is desired to determine the pressure decrease time Tdown according to the equation (15), such that the value Tdown is in reverse proportion to the long-time average value $\dot{V}$wa of the wheel acceleration $\dot{V}$wf. In the present embodiment, however, the maximum pressure decrease time is set to 125 msec., and the minimum pressure decrease time is set to 25 msec. for the rear wheels of the vehicle.

In step S13, the reference wheel speed Vwref and the bias value of the reference wheel speed Vwref are adjusted according to the following equations (16) and (17), based on the value "Noise2" associated with the wheel acceleration.

$$Vwref = Vwf + Noise2 \cdot K10 \quad (16)$$

$$Vwbias = K11 + Noise2 \cdot K12 \quad (17)$$

As is understood from the equations (16) and (17), the amounts of adjustments of the values Vwref and Vwbias increase with the value "Noise2". Further, the reducing gradient $\Delta$Vwref at which the reference wheel speed Vwref is lowered is set to "0.5 G" and stored in the RAM 44, and the moment T upon execution of step S13 is stored as Tmemo in the RAM 44. Further, the value "Flag" is set to "2".

After step S13 is executed as described above, the control flow goes to step S14, in which the "Valve1" is set to "1" since the current pressure decrease time Tdown (set in step S13) is positive. Consequently, the directional control valve 26 is switched to the pressure-decrease position to start decreasing the pressure in the brake cylinder 16, at a higher rate than the rate of increase in the same pressure which takes place through the flow restrictor 35. This pressure decreasing operation is referred to as "rapid pressure decrease" as compared with the "slow pressure increase" through the restrictor 35.

With the "Flag" set to "2" in step S13, step S5 is followed by step S15, in which the reference wheel speed Vwref and the pressure decrease time Tdown are reduced by a predetermined decrement which corresponds to one control cycle. In the present embodiment wherein the cycle time is 5 msec., the decrement time $\Delta$T is equal to 5 msec.

After the reference wheel speed Vwref and the pressure decrease time Tdown are decremented in step S15, the control flow goes to step S16. Usually, a negative decision (NO) is obtained in step S16. That is, an affirmative decision (YES) is obtained in a special situation where the friction coefficient of the road surface suddenly increases. This latter case will be described later. When a negative decision (NO) is obtained in step S16, step S17 is implemented to determine whether the pressure decrease time Tdown is larger than "0". Usually, the value Tdown is positive, and an affirmative decision (YES) is obtained in step S17, and step S18 follows. Since the "Flag" remains "2" as set in step S13, step S18 is followed by step S19 to determine whether the filtered value Vwf of the wheel speed is equal to or higher than the reference wheel speed Vwref. In an initial period of the pressure decrease operation, initiated in step S14, a negative decision (NO) is usually obtained in step S19, and step S19 is followed by step S14 to continue the rapid pressure decrease of the brake cylinder 16.

When the vehicle is running on a road surface having a relatively high friction coefficient $\mu$, a negative decision (NO) is usually obtained in step S17 before an affirmative decision (YES) is obtained in step S19. In this case, step S17 is followed by step S21 and subsequent steps to determine the mode of controlling the pressure in the brake cylinder 16. Immediately after the negative decision (NO) is obtained in step S17, a negative decision (NO) is obtained in steps S21 and S22, and the value Tdown is negative, whereby the slow pressure decrease mode is established in step S14, with the "Valve1" set to "0". In the next control cycle, an affirmative decision (YES) is obtained in step S21 and step S23 is executed to determine whether the filtered value Vwf of the wheel speed is considerably smaller than the reference wheel speed Vwref, or not, i.e., whether the value Vwf is smaller than a difference (Vwref−Vwbias) or not. Where the friction coefficient $\mu$ of the road surface is relatively high, a negative decision (NO) is obtained in step S23, and step S23 is followed by step S22. Immediately after an affirmative decision (YES) is obtained in step S21, a negative decision (NO) is obtained in step S22. Therefore, the slow pressure increase mode is maintained for some period following the commencement of the slow pressure increase.

When an affirmative decision (YES) is obtained in step S22, the control flow goes to step S24. If an affirmative decision (YES) is obtained in step S24, that is, if the filtered value Vwf of the wheel speed is smaller than the reference wheel speed Vwref, step S26 is executed to set the pressure decrease time Tdown to "5" msec. While the friction coefficient $\mu$ of the road surface is relatively high, a negative decision (NO) is usually obtained in step S24, and step S25 is implemented to determine whether the filtered value Vwf of the wheel acceleration is smaller than the adjusted value G'22 of the reference wheel acceleration G22 for the second pressure decrease, or not. In other words, step S25 is not executed until 35 msec. has passed after the rapid pressure decrease mode is changed to the slow pressure increase mode. This arrangement prevents an erroneous decision in step S25 due to noises, if the decision is made during some period following the termination of the rapid pressure increase. Thus, the period of 35 msec. is provided prior to the execution of step S25. The slow pressure increase mode remains as long as a negative decision (NO) is obtained in step S25. If an affirmative decision (YES) is obtained in step S25, the control flow goes to step S13 to establish the rapid pressure decrease mode again.

Thus, the brake pressure during running of the vehicle on the road surface having a relatively high friction coefficient $\mu$ is controlled in the pattern as indicated in FIG. 4(a).

Referring next to FIG. 4(b), there will be described the pattern of controlling the pressure in the brake cylinder 16 during running of the vehicle on the road surface whose friction coefficient $\mu$ is medium or relatively low. In this second control pattern, the first pressure decrease operation and the subsequent pressure decrease operations are effected in different manners. That is, the second and subsequent pressure decrease operations are similar to those in the first control pattern of FIG. 4(a) for the relatively high friction coefficient of the road surface, but the first pressure decrease operation is different from that in the first control pattern. While the friction coefficient of the road surface is medium or relatively low, the wheel speed is lowered to a comparatively large extent upon brake application to the wheel 14, and the amount of increase in the wheel speed by the first pressure decrease is relatively small. Accordingly, an affirmative decision (YES) is obtained in step S24 when this step is executed after the slow pressure increase which is effected as a result of negative decisions (NO) in steps S17, S21 and S22 as in the case of the first control pattern. Step S24 is therefore followed by step S26 to set the pressure decrease time Tdown to "5". In this case, the rapid pressure decrease mode is established for 5 msec, then the pressure decrease time Tdown is decremented to "0" in step S15, and a negative decision (NO) is obtained in steps S17, S21 and S22, whereby the value "Valve1" is set to "0" in step S14, to establish the slow pressure increase mode. When step S15 is executed again, the value Tdown is set to −5 msec., and the slow pressure increase mode is maintained, with the negative decision (NO) obtained in steps S17, S21 and S22. When the value Tdown is reduced to −35 msec. as a result of repeated execution of step S15, an affirmative decision (YES) is obtained in step S22, and step S24 is implemented. When an affirmative decision (YES) is obtained in step S24, the rapid pressure decrease mode is established again in step S14. Namely, the slow pressure increase for 35 msec. and the rapid pressure decrease for 5 msec. are alternately effected, so as to slowly decrease the pressure in the brake cylinder 16 until the speed of the wheel 14 is restored to a sufficiently high level. This pressure decreasing operation is referred to as "additional slow pressure decrease".

When the speed of the wheel 14 rises to a sufficiently high level, a negative decision (NO) is obtained in step S24, and the slow pressure increase is effected until an affirmative decision (YES) is obtained in step S25, as in the case of the first control pattern of FIG. 4(a) for the road surface having a relatively high friction coefficient. When the affirmative decision is obtained in step S25, step S13 is executed to establish the rapid pressure decrease mode in step S14.

Where the friction coefficient $\mu$ of the road surface is suddenly lowered to a medium or relatively low value after the anti-lock brake pressure control operation is initiated during running of the vehicle on the road surface having a relatively high friction coefficient, an affirmative decision (YES) is obtained in step S24 to alternately effect the 35-msec. slow pressure increase and the 5-msec. rapid pressure decrease, so that pressure in the brake cylinder 16 is lowered to a level suitable for the friction coefficient of the road surface on which the vehicle is currently running.

Where the friction coefficient $\mu$ of the road surface is extremely low, the first pressure decrease operation and the second and subsequent pressure decrease operations are effected differently, as indicated by the third control pattern of FIG. 4(c). In the first pressure decrease operation according to this third control pattern, an affirmative decision (YES) is obtained in step S23 to set the pressure decrease time Tdown to 5 msec., after the slow pressure increase is effected as a result of the negative decisions (NO) obtained in steps S17, S21 and S22, as in the first control pattern of FIG. 4(a). Accordingly, the slow pressure decrease operation for 10 msec. and the rapid pressure decrease operation for 5 msec. are alternately performed, to effect a slow pressure decrease of the brake cylinder 16, whose decrease rate is higher than that of the additional slow pressure decrease according to the second control pattern of FIG. 4(b) for the medium or relatively low friction coefficient $\mu$. After a negative decision (NO) is obtained in step S23, the 35-msec. slow pressure increase and the 5-msec. rapid pressure decrease are alternately effected, for providing an additional slow pressure decrease similar to that according to the second control pattern. Where the friction coefficient $\mu$ is extremely low, however, the wheel speed does not rise to a sufficiently high level and the affirmative decision (YES) remains in step S24, even when the brake cylinder pressure is zeroed by this additional slow pressure decrease. Consequently, the additional slow pressure decrease is continued to hold the brake cylinder pressure at the zero level for some length of time. When the wheel speed rises to a level which causes a negative decision (NO) to be obtained in step S24, the control flow goes to step S25. Immediately after the negative decision is obtained in step S24, a negative decision (NO) is obtained in step S25, whereby step S14 is executed to establish the slow pressure increase mode. When an affirmative decision (YES) is obtained in step S25 due to the slow pressure increase, the control flow goes to step S13 in which the pressure decrease time Tdown and the other values are set, and the rapid pressure decrease mode is established in step S14.

In the thus initiated second rapid pressure decrease operation according to the third control pattern of FIG. 4(c), the wheel speed is restored to a sufficiently high level while the pressure decrease time Tdown is positive, whereby an affirmative decision (YES) is obtained in step S19, and the control flow goes to step S20. In this step S20, the pressure decrease time Tdown is set to T2, which increases with an increase in a difference between T1 (T−Tmemo) and a reference time C3, where T1 represents the time which has passed after the start of the rapid pressure decrease caused as a result of execution of step S14 described just above. Namely, the pressure decrease time Tdown is changed from the first pressure decrease time T0 to a sum (T1+T2) of the time lapse T1 and the second pressure decrease time T2. If the pressure decrease time Tdown is a negative value, the slow pressure increase mode is established in step S14. If the time Tdown is a positive value, this indicates that the reduction in the amount of slip of the wheel 14 is extremely small with an extremely low friction coefficient $\mu$ of the road surface. In this case, therefore, the "Flag" is set to "3" in step S20. Accordingly, an affirmative decision (YES) is obtained in step S18 in the next control cycle, and the control flow goes directly to step S14 while skipping steps S19 and S20, whereby the rapid pressure decrease is effected for the pressure decrease time Tdown which was set in step S20. When the second pressure decrease time T2 has passed, a negative decision (NO) is obtained in steps S17, S21 and S22, and the slow pressure increase mode is established in step S14. When an affirmative decision (YES) is obtained in step S25 due to the slow pressure increase, step S13 is executed to determine the first pressure decrease time T0 (Tdown) and the other values.

Where the friction coefficient of the road surface is suddenly lowered to an extremely low value after the anti-lock brake pressure control operation is initiated on the road surface having a relatively high, medium or relatively low friction coefficient $\mu$, the additional slow pressure decrease is effected as in the first pressure decrease operation described above with respect to the control pattern of FIG. 4(c), so that the pressure in the brake cylinder 16 is lowered to a level suitable for the extremely low friction coefficient of the road surface on which the vehicle is currently running.

Where the friction coefficient of the road surface is increased to a medium or relatively low value after the anti-lock brake pressure control operation is initiated on the road surface having an extremely low friction coefficient, the pressure in the brake cylinder 16 is controlled in a pattern as indicated in FIG. 4(d). When the friction coefficient is suddenly increased, the filtered value $\dot{V}wf$ of the wheel acceleration becomes larger than usual, and exceeds the adjusted value $G'4$ of the reference wheel acceleration G4 (for starting a forced rapid pressure increase). Consequently, step S16 is followed by steps S27 and S28. While the brake cylinder pressure is in the process of being lowered, the pressure decrease time Tdown is a positive value, and an affirmative decision (YES) is obtained in step S27. As a result, step S28 is executed to set the pressure decrease time Tdown to "0" for establishing the slow pressure increase mode in step S14, and to decrement the long-time average value $\dot{V}wa$ of the wheel acceleration by a decrement amount $\alpha$, so that the average value $\dot{V}wa$ is changed to a value suitable for the increased, i.e., current friction coefficient of the road surface. When an affirmative decision (YES) is obtained in step S25 as a result of the slow pressure decrease, the pressure decrease time Tdown is changed to a value suitable for the increased friction coefficient.

When the vehicle running speed is lowered below a predetermined limit or the brake pedal 10 is released to the non-operated position during the anti-lock brake pressure control operation in the control patterns as described above, the control flow goes to a brake pressure control termination routine, in which the "Flag", "Valve0" and "Valve1" are reset to "0".

It will be understood from the above description of the present embodiment that means for detecting a slip condition of the wheel 14 is constituted by the speed sensor 38, waveform shaper 50, and portions of the control device 37 which are assigned to execute steps S2–S4, and means for controlling the directional control valve 26 (pressure regulating valve device) is constituted by the driver 52, and portions of the control device 37 assigned to execute steps S1, S10 and S14. It will also be understood that a portion of the control device 37 assigned to execute step S4 constitutes means for detecting an average value of the acceleration of the wheel 14, and portions of the control device 37 assigned to execute steps S11, S25 and S13 constitute means for determining the first pressure decrease time, while portions of the control device 37 assigned to execute steps S19 and S20 constitute means for determining the second pressure decrease time.

FIGS. 5 and 6 show changes in the filtered value Vwf of the wheel speed, filtered value $\dot{V}wf$ of the wheel acceleration and brake cylinder pressure P where the anti-lock brake pressure control device of the present embodiment is operated on the road surfaces whose friction coefficients are "1" (relatively high value) and "0.1" (extremely low value), respectively. In the present embodiment, the values G1, G21, G3, G4, K1, K2, K3, K4, K5, K6, K8, K9, C1, C3 and C4 are set as follows:

G1 = −0.5 G ∼ −0.75 G
G21 = −1.5 G ∼ −2 G
G3 = 2 G
G4 = 3 G
K1 = 0.625 ∼ 0.75
K2 = 0.125 ∼ 0.2
K3 = 0.02 ∼ 0.03
K4 = K2
K5 = 1 ∼ 2
K6 = (0.25 ∼ 0.5)K4
K8 ≈ 1
K9 ≈ 1
C1 = 15
C3 = 60 msec
C4 = 2.2

The values K7, G22 and C2 have the following four combinations, which are selectively used:

| K7  | 0       | 0.5  | 0.75  | 1    |
|-----|---------|------|-------|------|
| G22 | −1.5 (G)| −1   | −0.75 | −0.5 |
| C2  | −0.1    | −0.2 | −0.3  | −0.5 |

It will be understood that the value G22 is equal to (−1.5+K7). The most desired value K7 is 0.75.

When the friction coefficient $\mu$ of the road surface is relatively high, the time required for decreasing the pressure in the brake cylinder 16 is relatively short, and the brake cylinder pressure is decreased for the time Tdown (first pressure decrease time T0) which is determined by the long-time average $\dot{V}wa$ of the wheel acceleration, as indicated in FIG. 5. When the friction coefficient is extremely low, on the other hand, the brake cylinder pressure is decreased for the time (T1+T2) which is determined when the filtered value Vwf of the wheel speed exceeds the reference wheel speed Vwref, as indicated in FIG. 6. In each of the two cases of FIGS. 5 and 6, the pressure in the brake cylinder 16 is adequately controlled so as to prevent or minimize the locking or skidding of the wheel 14 on the road surface. It is noted that the graph of FIG. 6 indicates the additional slow pressure decrease operation consisting of slow pressure increasing steps and rapid pressure decreasing steps, which occur alternately for the terminal portion of the first pressure decreasing operation, as a result of comparison of the filtered value Vwf of the wheel speed with the reference wheel speed Vwref which is reduced by a amount equal to the bias value Vwbias.

The graphs of FIGS. 7(a), 7(b) and 7(c) show effects provided by adjustments of the various reference values depending upon quantified values of noises included in the wheel acceleration value $\dot{V}w$. The three cases of FIGS. 7(a), 7(b) and 7(c) are the results of experiments each conducted on the road surface having a friction coefficient $\mu$ of 0.3. In the case of FIG. 7(a), the filtered value $\dot{V}wf$ of the wheel acceleration value $\dot{V}w$ included substantially no noises. In the case of FIG. 7(b), the peak-to-peak value of the filtered value $\dot{V}wf$ was about 4G. In the case of FIG. 7(c), the peak-to-peak value of the filtered value $\dot{V}wf$ was about 8G. The graphs of FIGS. 7(b) and 7(c) show that the anti-lock brake pressure control operations are adequately performed even with large amounts of noises included in the filtered value $\dot{V}wf$, as a result of adjustments of the reference wheel acceleration G22, reference wheel speed Vwref, and bias value Vwbias of the reference wheel speed Vwref.

In the embodiment described above, the slow pressure decrease is effected after the elapse of the second pressure decrease time T2 which is determined in step S20 so as to change with the time T1 between the start of the pressure decrease in step S13 and the moment of execution of step S20. However, it is possible to effect a rapid pressure decrease by a suitable amount, by increasing the reference wheel speed Vwref with the second pressure decrease time T2.

An example of the modified arrangement described above is obtained by adding steps S30, S31 and S32 to the flow chart of FIG. 3(B). Step S30 is provided to increase the reference wheel speed Vwref with the second pressure decrease time T2 (Tdown) calculated in step S20, and to change the reducing gradient ΔVwref of the reference wheel speed Vwref from 0.5 G (set in step S13) to 0.2 G. In the next control cycle, step S18 is followed by step S31 since the "Flag" was changed to "3". Consequently, step S31 is repeatedly executed to effect a rapid pressure decrease until an affirmative decision (YES) is obtained in step S31. The control flow then goes to step S32 to reset the pressure decrease time Tdown to "0" and restore the "Flag" to "2", for establishing the slow pressure increase mode.

In the present modified embodiment, the time for the rapid pressure decrease is shortened when the friction coefficient $\mu$ of the road surface is changed from a relatively low value to a relatively high value during an anti-lock brake pressure control operation. Thus, the anti-lock brake pressure control is effected in a manner suitably following a change in the friction coefficient of the road surface. FIGS. 8(a) and 8(b) show brake pressure control operations when the friction coefficient of the road surface is suddenly increased from 0.1 to 0.3 while the pressure in the brake cylinder 16 is being lowered. The graph of FIG. 8(a) shows the case where steps S30–S32 are not provided. In this case, the brake cylinder pressure is decreased for the second pressure decrease time T2, i.e., Tdown=(T−Tmemo−C3)C4 determined before the sudden increase in the friction coefficient, irrespective of this sudden increase, whereby the filtered value Vwf of the wheel speed is excessively increased to a level close to the vehicle speed. In the case where steps S30–32 are executed, the time for the rapid pressure decrease is reduced after the sudden increase of the friction coefficient, as indicated in FIG. 8(b), whereby an excessive rise of the filtered value Vwf is avoided. As a result of this response to the sudden increase in the friction coefficient, the rate of decrease in the vehicle speed is increased. The graph of FIG. 8(c) indicates a change in the filtered value Vwf of the wheel acceleration, while the graph of FIG. 8(d) indicates changes in the pressure P in the brake cylinder 16.

Referring next to FIG. 9, there is illustrated another embodiment of the anti-lock brake control apparatus of the present invention adapted to attain the third object of the invention described above.

Figure 3:
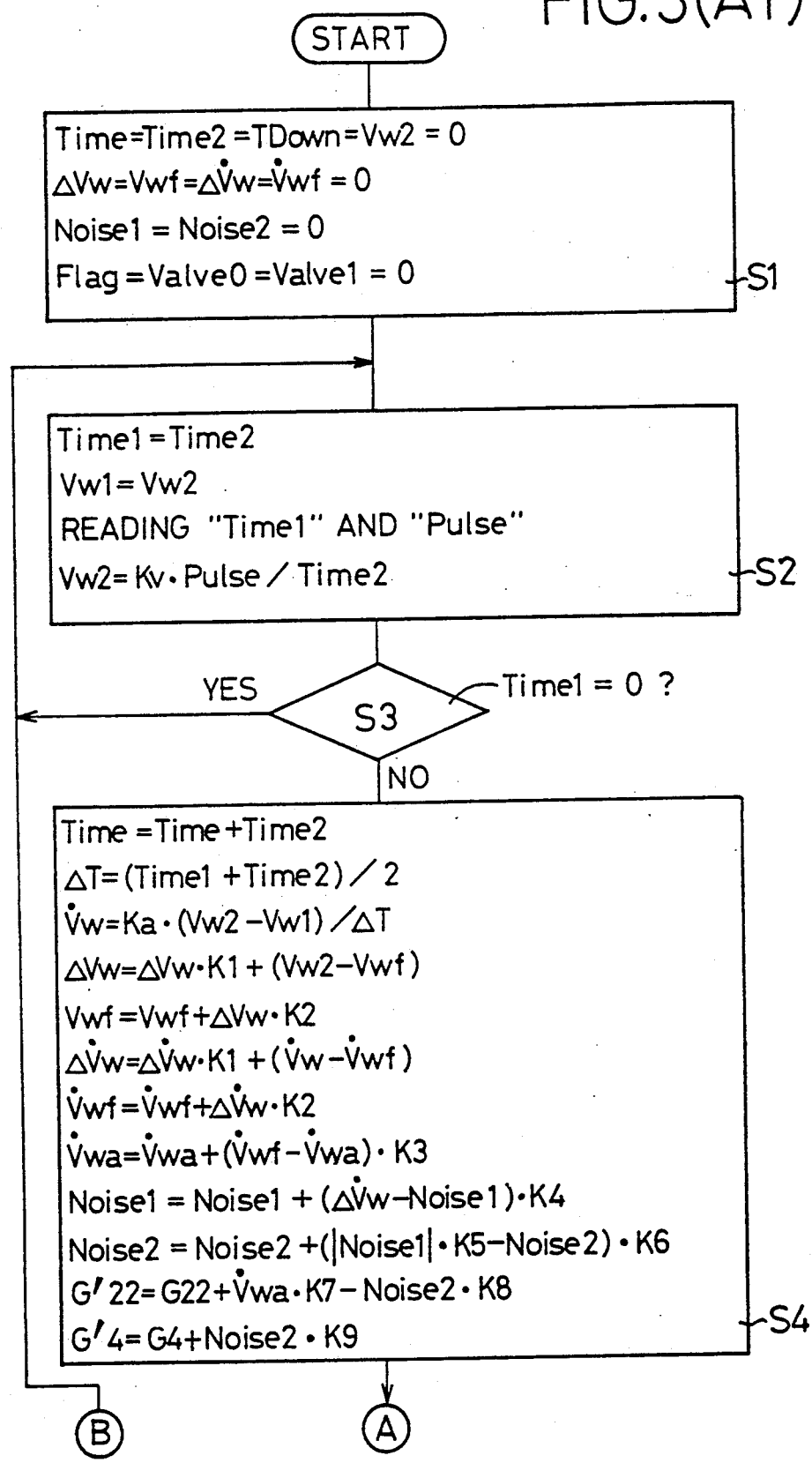
FIGS. 3(A1), 3(A2) and 3(B1)-3(B3) are flow charts illustrating only those control programs stored in a read-only memory of the control device, which relate to the principle of the present invention.
Figure 3:
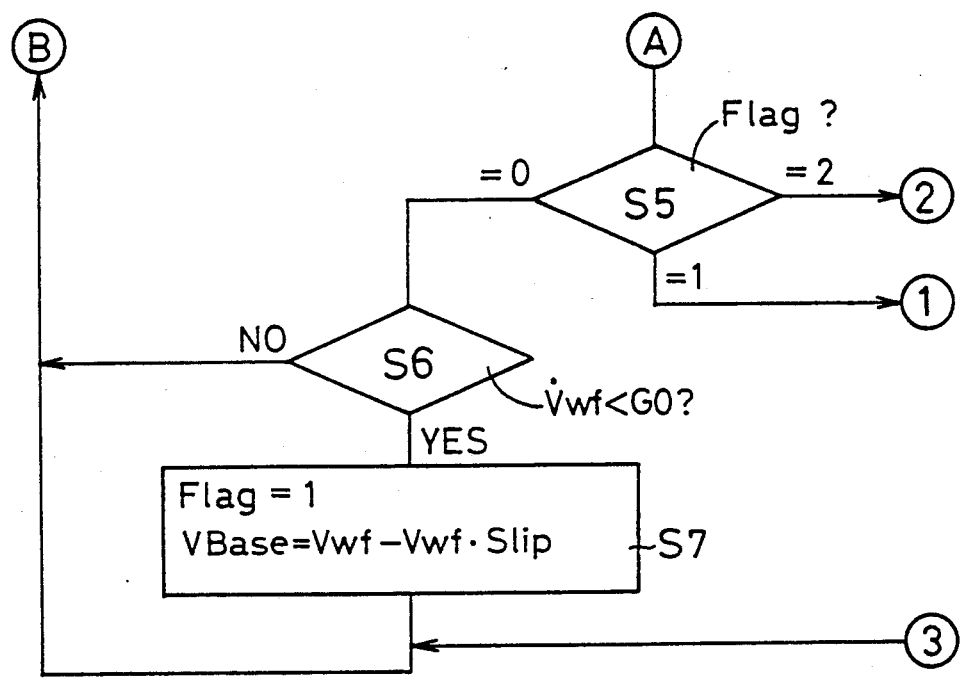
Figure 3:
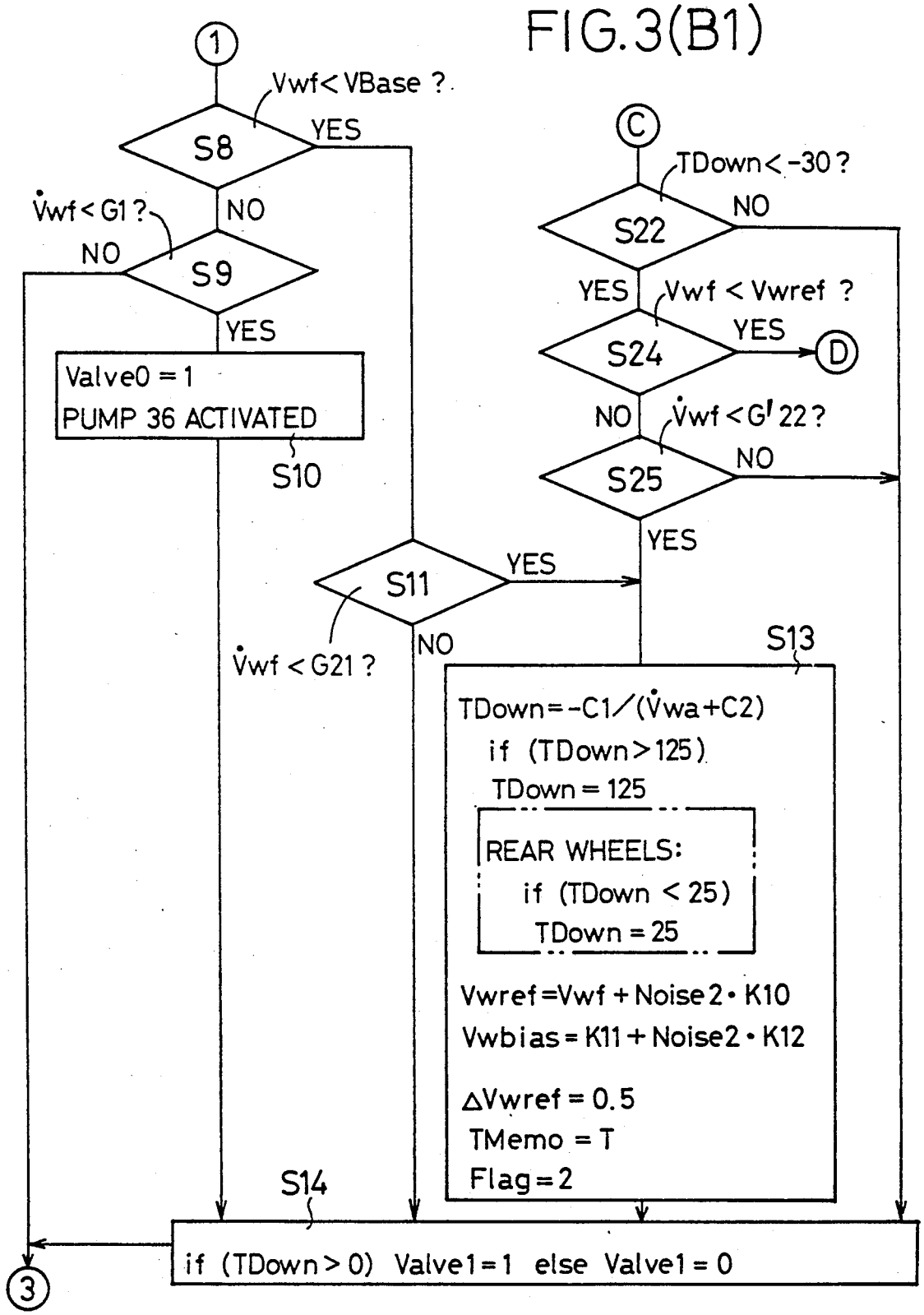
Figure 3:
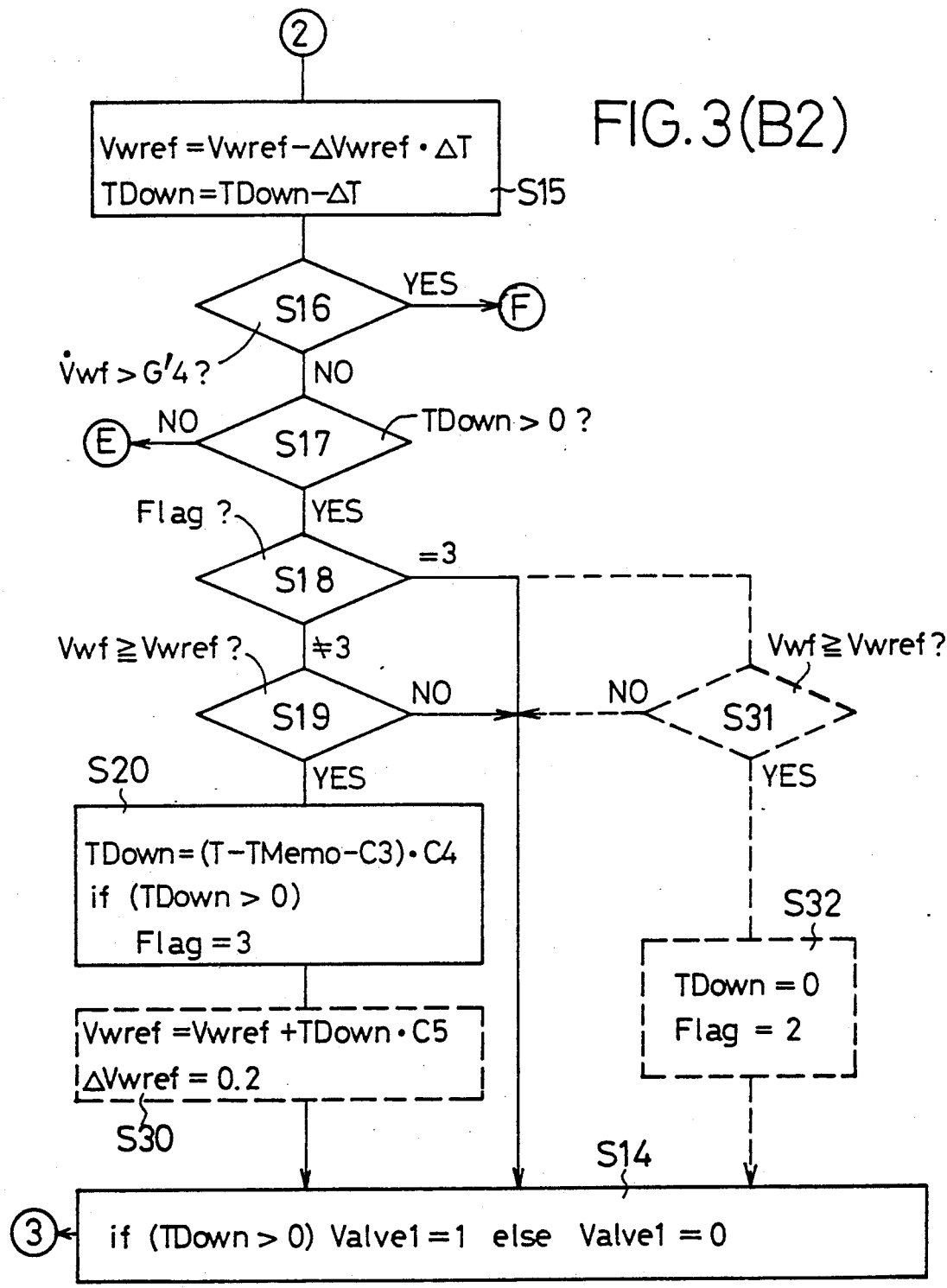

The present embodiment is identical with the embodiments of FIGS. 1–3, except for the control program stored in the ROM 42. In the interest of brevity and simplification, only the operation of this embodiment will be described by reference to the flow chart of FIG. 9. Characters or symbols additionally used in FIG. 9 are defined as follows:

Vwq: Long-time smoothed value of wheel speed obtained by smoothing the filtered value Vwf of the wheel speed by a large time constant $\tau q$ G2: Reference wheel acceleration for starting pressure decrease G'2: G2 adjusted by noise C11–C15: Constants for calculating pressure decrease time Vmemo: Pseudo average value of wheel acceleration Tcheck: Time duration between the start of pressure decrease and the moment of detection of wheel acceleration recovery rate $\Delta$Vmemo: Wheel acceleration recovery rate represented by difference in Vmemo upon starting of the pressure decrease and detection of the wheel acceleration recovery rate Step S40 corresponds to step S1 of the flow chart of FIG. 3(A), and step S41 corresponds to steps S2–S4 of FIG. 3(A). In step S41, however, the calculation of the value G'4 according to the equation (13) is not performed, and is replaced by the calculation of the value Vwq according to the following equation (18):

$$Vwq = Vwq + (Vwf - Vwq)\Delta t/\tau q \quad (18)$$

The time constant $\tau q$ is set to 100 msec. in this embodiment. The present anti-lock brake control apparatus is adapted to be used for a motor vehicle wherein the frequency of vibrations of the wheels involving expansion and contraction of suspension springs ranges from 10 Hz to 15 Hz, and wherein the period of the vibrations ranges from 67 msec to 100 msec. The time constant $\tau q$ is set to the maximum value of the period of the wheel vibrations, which is 100 msec. The reason for this setting will be explained later.

Step S41 is followed by step S42 to select the next operation depending upon the value "Flag". In the first control cycle in which the value "Flag" is reset to "0" in step S40, step S42 is followed by step S43 to determine whether the filtered value $\dot{V}$wf of the wheel acceleration is smaller than the reference wheel acceleration G1 for starting the anti-lock brake pressure control operation. In the first control cycle, a negative decision (NO) is obtained in step S43, and the control flow returns to step S41. When an affirmative decision (YES) is obtained in step S43 after repetition of steps S41–S43, the control flow goes to step S44 to set the "Flag" to "1", and step S45 to set the "Valve0" to "1" and generates a command to activate the pump drive motor 36. As a result, the shut-off valve 20 is switched to the closed position, to change the rapid pressure increase mode to the slow pressure increase mode, and the pump 34 is turned on.

In the next control cycle, step S42 is followed by step S46, since the "Flag" was set to "1" in step S44 in the last control cycle. An affirmative decision (YES) is obtained in step S46 when a suitable time has passed to allow the filtered value $\dot{V}$wf of the wheel acceleration to become smaller than the value G'2, which is the reference acceleration value adjusted by noise. At this time, step S46 is followed by step S47 in which the pressure decrease time Tdown as the first pressure decrease time T0, and the pseudo average value Vmemo of the wheel acceleration are calculated according to the following equations (19) and (20);

$$Tdown = C11/\dot{V} - \dot{V}wa \quad (19)$$

$$Vmemo = C12(Vwf - Vwq) + C13 - C14 \cdot Vwf \quad (20)$$

While the equation (19) appears to be different from the above equation (15), these two equations provide substantially the same result. That is, the equation (19) is a theoretical equation, while the equation (15) is an approximation equation.

The value (Vwf−Vwq) in the equation (20) is a difference in the wheel speed between points of time P1 and P'2 in the graph of FIG. 10. This graph shows the curves representative of the filtered value Vwf of the wheel speed, and the long-time smoothed value Vwq of the wheel speed which is obtained by smoothing the filtered value Vwf by the predetermined time constant of 100 msec.

Although the values Vwf and Vwq actually include noises, the higher harmonics of the noises are removed from the curves as shown in FIG. 10. Further, the curves are shown such that the curve of the long-time smoothed value Vwq is offset by 100 msec. with respect to the curve of the filtered value Vwf in the negative direction of time. Therefore, the filtered value Vwf at point P1 and the long-time smoothed value Vwq at point P'2 are obtained at the same time. While it is natural to use the difference in the value Vwf between the points P1 and P2 as the average value of the wheel acceleration at the time of starting of decrease in the brake cylinder pressure, the calculation of this difference by a computer requires a memory having a large capacity. Suppose the pressure decrease is started at the point P1, the point P2 is automatically determined to be a point 100 msec. before the point P1. At the time when the filtered value Vwf is obtained at the point P2, the computer is not yet capable of determining that the pressure decrease should be started at the point P1 which is 100 msec. after the point P2. Namely, the computer should store all the results of calculation of the filtered values Vwf obtained at the predetermined calculation intervals, so that one of the multiple filtered values Vwf stored in the memory which was obtained 100 msec before the point P1 is selected when the point P1 is determined as the point of start of the pressure decrease. For this reason, the computer requires a large-capacity memory. In the present arrangement, on the other hand, the long-time smoothed value Vwq at the point P'2 is obtained at the same time as the filtered value Vwf at the point P1. The difference between the filtered values at the two points P1 and P2 is almost proportional to the difference between the filtered values Vwf at the points P1 and P'2. Therefore, the latter difference is used as the pseudo average value Vmemo of the wheel acceleration, which is used in place of the average value of the wheel acceleration.

In the equation (20), however, the value (Vwf−Vwq) per se is not used as the pseudo average value Vmemo, but the value (Vwf−Vwq) adjusted by the constants C12, C13 and C14 is used as the pseudo average value Vmemo. In particular, the value −C14·Vwf is a member for adjusting the pseudo average value Vmemo such that the absolute value of Vmemo increases with an increase in the filtered value Vwf. If the pressure decrease operation is started when the slip ratio of the wheel 14 reaches the same value, irrespective of the filtered value Vwf of the wheel speed, the absolute value of the pseudo average value Vmemo of the wheel acceleration should increase with the filtered value Vwf. To adjust the pseudo average value Vmemo so as to increase with the filtered value Vwf, the member $-C \cdot Vwf$ is included in the equation (20).

In step S47, a content Tc of a timer for measuring the time between the start of the pressure decrease and the moment of detection of the wheel acceleration recovery rate is set to a predetermined value "Tcheck", which is 65 msec. in the present embodiment. Further, the "Flag" is set to "2" in step S47.

The control flow then goes to step S48. Since the value Tdown at this time is a positive value, the "Valve1" is set to "1" to establish the pressure decrease mode.

In the next control cycle, step S42 is followed by step S49 since the "Flag" was set to "2". In step S49, the timer content Tc and the pressure decrease time Tdown are both decremented by a predetermined value $\Delta T$ (5 msec.). Step S49 is followed by step S50 to determine whether the timer content Tc is positive or not. In an initial period of the pressure decrease operation, the content Tc is positive and an affirmative decision (YES) is obtained in step S50, whereby step S51 is executed. Since the "Flag" is currently "1", a negative decision (NO) is obtained in step S51, and the control flow goes to step S48 again.

Subsequently, steps S41, S42, S49, S50, S51 and S48 are repeatedly executed until the timer content Tc becomes negative. Since the pressure decrease time Tdown set in step S47 is shorter than the predetermined time Tcheck, the value Tdown becomes negative before a negative decision (NO) is obtained in step S50. Accordingly, the "Valve1" is set to "0" in step S48, to terminate the rapid pressure decrease mode and establish the slow pressure increase mode.

When a negative decision (NO) is later obtained in step S50, step S52 is implemented to determine whether the pressure decrease time Tdown is positive or not. Since the Tdown set in step S47 is shorter than the predetermined time Tcheck, a negative decision (NO) is necessarily obtained in step S52, and step S53 is executed to calculate the recovery rate $\Delta Vmemo$ of the wheel acceleration according to the following equation (21):

$$\Delta Vmemo = (Vwf - Vwq) - Vmemo \quad (21)$$

In the present embodiment of FIG. 9, the recovery rate $\Delta Vmemo$ of the wheel acceleration is obtained as a difference between the pseudo average value Vmemo of the wheel acceleration upon starting of the pressure decrease operation and upon expiration of the predetermined time Tcheck Also in step S53, the "Flag" is set to "3".

The control flow then goes to step S54 to determine whether the recovery rate $\Delta Vmemo$ of the wheel acceleration is a positive value or not. If the recovery rate $\Delta Vmemo$ is positive, step S51 is executed. Since the "Flag" was set to "3" (which is larger than "2"), step S51 is followed by step S55 to set the "Flag" to "1". If a negative decision (NO) is obtained in step S54, step S56 is executed to calculate the pressure decrease time Tdown as the second pressure decrease time T2 according to the following equation (22):

$$Tdown = -C15 \cdot \Delta \Delta Vmemo \quad (22)$$

That is, if the recovery rate $\Delta Vmemo$ upon execution of step S54 is a positive value, this indicates that the recovery rate is sufficient. In this case, therefore, the second pressure decrease time T2 is not set, and the slow pressure increase operation is continued. If the recovery rate $\Delta Vmemo$ is zero or negative, this indicates that the recovery rate is not sufficient. In this case, the slow pressure decrease is additionally effected for the second pressure decrease time which is determined so as to increase with an increase in the absolute value of $\Delta Vmemo$. In this embodiment, the reference recovery rate $\Delta Vmemo$ is zero.

An affirmative decision (YES) is obtained in step S52 when this step is executed after the pressure decrease time Tdown is set in step S56, and step S51 is executed. At this time, a negative decision (NO) is obtained in step S51 since the "Flag" is currently "3" (which is larger than "2"). Consequently, step S51 is followed by step S48, in which the "Valve1" is set to "1" to re-establish the rapid pressure decrease mode. When the pressure decrease time Tdown set in step S56 has elapsed, a negative decision (NO) is obtained in step S52, and steps S53 and S54 are again executed. Since affirmative decisions (YES) are usually obtained in steps S54 and S51 at this time, step S55 is executed to set the "Flag" to "1", and the rapid pressure decrease mode is replaced by the slow pressure increase mode in step S48.

Figure 11A:
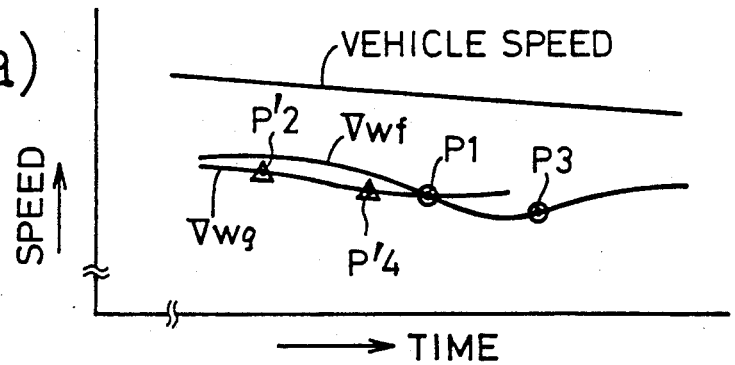
FIGS. 11(a), 11(b), 12(a) and 12(b) are graphs indicating results of experiments conducted on the embodiment of FIG. 9.
Figure 11B:
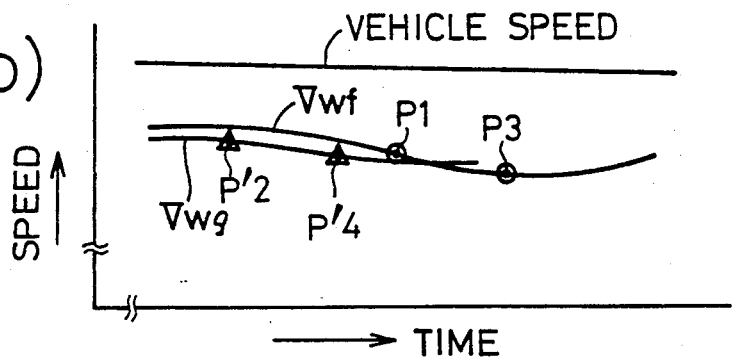
Figure 12A:
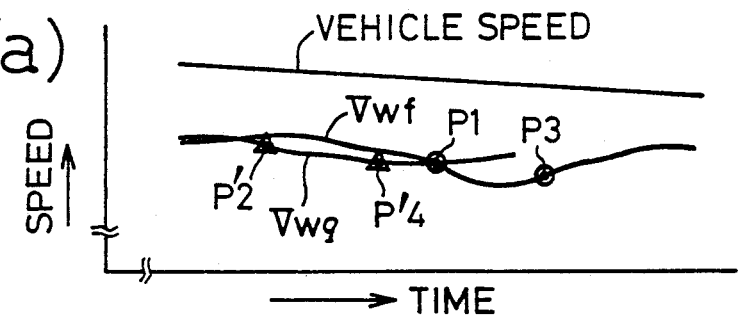
Figure 12B:
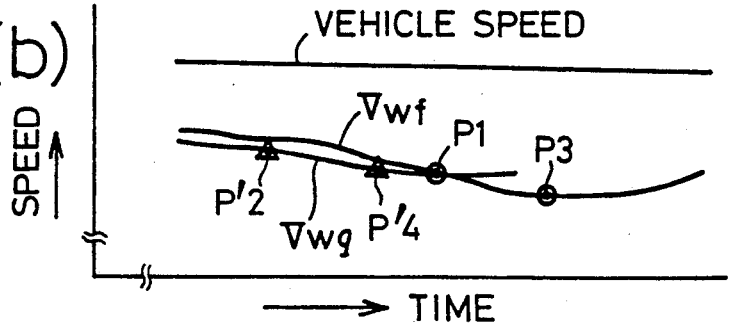

The graphs of FIGS. 11(a), 11(b), 12(a) and 12(b) show the results of braking experiments of a vehicle equipped with the anti-lock brake control apparatus according to the present embodiment, which were conducted on a road surface covered with compacted snow and on a frozen road surface. FIGS. 11(a) and 12(a) show the cases on the snow-covered road surface, while FIGS. 11(b) and 12(b) show the cases on the frozen road surface. FIGS. 11(a) and 11(b) show the cases where the amount of noise included in the wheel speed signal is relatively small. In the case of the snow-covered road surface of FIG. 11(a), the recovery rate $\Delta Vmemo$ of the wheel acceleration is positive. This can be confirmed by the fact that the gradient of the straight line connecting points P3 and P'4 is smaller than that of the straight line connecting points P1 and P'2. In the case of the frozen road surface of FIG. 11(b), the recovery rate is negative. Similar tendency exits in the cases of the FIGS. 12(a) and 12(b) where the amount of the noise is relatively large. It will be understood from the graphs of FIGS. 12(a) and 12(b) that the gradient of the filtered value Vwf of the wheel speed irregularly changes. If the pressure decrease time is determined based on the average value of the wheel acceleration detected in a comparatively short length of time, the determined pressure decrease time for the snow-covered road surface may be unreasonably longer than that for the frozen road surface. According to the present embodiment, however, the sufficiently large time constant $\tau q$ of 100 msec. which is larger than the period of the vibrations of the vehicle wheels is used for obtaining the average value of the wheel acceleration during a period longer than the vibration period. This arrangement effectively eliminates an adverse effect of the noises caused by the wheel vibrations, on the determination of the pressure decrease time.

While the present invention has been described in its presently preferred embodiments, with a certain degree of particularity, it is to be understood that the invention may be embodied with various changes, modifications and improvements, which may occur to those skilled in the art, without departing from the spirit and scope of the invention defined in the following claims.

What is claimed is:

1. An anti-lock brake control apparatus for controlling a pressure in a brake cylinder provided for braking a wheel of a vehicle, comprising:

a two-position directional control valve disposed between the brake cylinder and a hydraulic pressure source, and having a pressure-increase position and a pressure-decrease position for increasing and decreasing the pressure in said brake cylinder, respectively;

slip detecting means for detecting a slip condition of said wheel;

control means responsive to said slip detecting means, for controlling said directional control valve so as to prevent excessive slipping of the wheel;

acceleration average detecting means for obtaining an average value of an acceleration of the wheel during a period until the slip condition detected by said slip detecting means deteriorates to a predetermined reference condition; and pressure decrease time determining means for determining a pressure decrease time substantially in reverse proportion to the average value of acceleration of the wheel which is obtained by said acceleration average detecting means when said slip condition has deteriorated to said reference condition, and supplying said control means with the determined pressure decrease time.

2. An anti-lock brake control apparatus according to claim 1, wherein said reference condition is a condition that the acceleration of the wheel has been lowered to a reference level.

3. An anti-lock brake control apparatus according to claim 2, further comprising:

rapid pressure-increase mode establishing means for resetting said pressure decrease time determined by said pressure decrease time determining means, and switching said directional control valve to said pressure-increase position to establish a rapid pressure increase mode, when said acceleration of the wheel exceeds another reference level higher than said reference level; and adjusting means for adjusting said average value of the acceleration of the wheel to a higher value, when said rapid pressure increase mode is established.

4. An anti-lock brake control apparatus according to claim 1, further comprising rotation detecting means for detecting one of a rotating speed and the acceleration of said wheel, and a digital filter for eliminating a higher harmonic of said one of the rotating speed and acceleration of the wheel detected by said rotation detecting means.

5. An anti-lock brake control apparatus according to claim 1, further comprising rotation detecting means for detecting a rotating speed and the acceleration of said wheel, noise quantifying means for quantifying a noise included in the acceleration of the wheel detected by said rotation detecting means, and reference condition adjusting means for adjusting said reference condition depending upon said noise quantified by said noise quantifying means.

6. An anti-lock brake control apparatus according to claim 1, wherein said pressure decrease time determining means comprises means for allowing a predetermined time duration before determining whether said slip condition of the wheel has deteriorated to said reference condition, after said control means switches said directional control valve from said pressure-decrease position to said pressure-increase position.

7. An anti-lock brake control apparatus according to claim 1, further comprising:

a shut-off valve disposed between said brake cylinder and said hydraulic pressure source, in parallel connection with said directional control valve;

a flow restrictor disposed between said hydraulic pressure source and said directional control valve; and slow pressure-increase mode establishing means for normally holding said shut-off valve in an open position, and switching said shut-off valve to a closed position when the slip condition of said wheel has deteriorated for the first time to another reference condition representative of a slip condition which is improved over that represented by said reference condition, whereby a slow pressure increase mode is established to reduce a rate of increase in the pressure in said brake cylinder to a value lower than that determined while said shut-off valve is placed in said open position.

8. An anti-lock brake control apparatus according to claim 1, further comprising:

pressure-increase mode establishing means for switching said directional control valve to said pressure-increase position to establish a pressure increase mode, when said slip condition of the wheel has improved to a second reference condition upon expiration of said pressure decrease time; and additional slow pressure-decrease mode establishing means for placing said directional control valve alternately in said pressure-increase and pressure-decrease positions to establish an additional slow pressure decrease mode, when said slip condition of the wheel has not improved to said second reference condition upon expiration of said pressure decrease time, said additional slow pressure decrease mode being maintained until said slip condition has decreased to said second reference condition.

9. An anti-lock brake control apparatus according to claim 8, further comprising additional rapid pressure-decrease mode establishing means for holding said directional control valve in said pressure-decrease position to establish an additional rapid pressure-decrease mode, when the slip condition of the wheel upon expiration of said pressure decrease time is deteriorated over a third reference condition representative of a slip condition deteriorated over said second reference condition, said additional rapid pressure-decrease mode being maintained until said slip condition has improved to said third reference condition 10. An anti-lock brake control apparatus according to claim 8, wherein said second reference condition is a condition that a rotating speed of said wheel has increased to a reference level.

11. An anti-lock brake control apparatus according to claim 1, wherein said reference condition, said pressure decrease time, and said pressure decrease time determining means are a first reference condition, a first pressure decrease time and first pressure decrease time determining means, respectively, said anti-lock brake control apparatus further comprising second pressure decrease time determining means, operable when said slip condition of the wheel has improved to a second reference condition, for determining a second pressure decrease time and supplying said control means with the determined second pressure decrease time, if a time duration between a moment when said slip condition of the wheel has deteriorated to said first reference value corresponding to said first reference condition and a moment when said slip condition has improved to said second reference condition is longer than a reference time, said second pressure decrease time determining means determining said second pressure decrease time such that said second pressure decrease time increases with an increase in a difference between said time duration and said reference time.

12. An anti-lock brake control apparatus according to claim 11, wherein said second reference condition is a condition that a rotating speed of said wheel has increased to a reference level.

13. An anti-lock brake control apparatus according to claim 1, wherein said reference value corresponding to said reference condition and said pressure decrease time are a first reference value and a first pressure decrease time, respectively, said anti-lock brake control apparatus further comprising second reference value adjusting means for adjusting a second reference value corresponding to a second reference condition, if a time duration between a moment when said slip of the wheel has increased to said first reference value corresponding to said first reference condition and a moment when said slip has decreased to said second reference value is longer than a reference time, said second reference value adjusting means adjusting said second reference value such that the adjusted second reference value changes with a difference between said time duration and said reference time.

14. An anti-lock brake control apparatus according to claim 1, wherein said reference condition, said pressure decrease time, and said pressure decrease time determining means are a first reference condition, a first pressure decrease time and first pressure decrease time determining means, respectively, said anti-lock brake control apparatus further comprising:
recovery detecting means for detecting a recovery strength of the acceleration of said wheel when a predetermined time has passed after said control means is supplied with said first pressure decrease time; and
second pressure decrease time determining means for determining a second pressure decrease time and supplying said control means with the determined second pressure decrease time, when said recovery strength detected by said recovery detecting means is smaller than a reference value, said second pressure decrease time determining means determining said second pressure decrease time such that said second pressure decrease time increases with an increase in a difference between the detected recovery strength and said reference value.

15. An anti-lock brake control apparatus according to claim 14, wherein said recovery detecting means detects said recovery strength as a difference between a first acceleration value of the wheel detected when said slap condition of the wheel has deteriorated to said first reference condition, and a second acceleration value of the wheel detected when said recovery detecting means determines whether the detected recovery strength is smaller than said reference value.

16. An anti-lock brake control apparatus according to claim 15, further comprising:
rotation detecting means for detecting a rotating speed of said wheel;
a digital filter for eliminating a higher harmonic of the rotating speed detected by said rotation detecting means; and
smoothing means for smoothing said detected rotating speed by a time constant larger than a time constant of said digital filter,
said recovery detecting means detecting each of said first and second acceleration values as a difference between a filtered value produced by said digital filter and a long-time smoothed value of said rotating speed which is smoothed by said smoothing means.

17. An anti-lock brake control apparatus according to claim 16, wherein said time constant of said smoothing means is no less than a period of vibrations of said wheel.

18. An anti-lock brake control apparatus according to claim 15, further comprising first acceleration adjusting means for adjusting said first acceleration value of said wheel such that an absolute value of the adjusted first acceleration value increases with an increase in the rotating speed of the wheel detected by said rotation detecting means.

* * * * *